(12) United States Patent
Lu et al.

(10) Patent No.: US 12,309,779 B2
(45) Date of Patent: May 20, 2025

(54) RESOURCE CONFIGURATION METHOD AND APPARATUS, TERMINAL, AND NON-VOLATILE STORAGE MEDIUM

(71) Applicant: GUANGDONG OPPO MOBILE TELECOMMUNICATIONS CORP., LTD., Guangdong (CN)

(72) Inventors: Qianxi Lu, Dongguan (CN); Huei-Ming Lin, South Yarra (AU); Zhenshan Zhao, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 268 days.

(21) Appl. No.: 17/854,195

(22) Filed: Jun. 30, 2022

(65) Prior Publication Data

US 2022/0338187 A1    Oct. 20, 2022

Related U.S. Application Data

(63) Continuation of application No. PCT/CN2020/072994, filed on Jan. 19, 2020.

(51) Int. Cl.
*H04W 72/20* (2023.01)
*H04L 1/08* (2006.01)
*H04W 72/0446* (2023.01)

(52) U.S. Cl.
CPC ............ *H04W 72/20* (2023.01); *H04L 1/08* (2013.01); *H04W 72/0446* (2013.01)

(58) Field of Classification Search
None
See application file for complete search history.

(56) References Cited

U.S. PATENT DOCUMENTS 11,979,893 B2 * 5/2024 Wu ................. H04L 5/0048
2014/0307674 A1 * 10/2014 Feuersaenger ........ H04W 72/21
370/329

(Continued)

FOREIGN PATENT DOCUMENTS

CN     103796311 A     5/2014
CN     107197523 A     9/2017

(Continued)

OTHER PUBLICATIONS

3rd Generation Partnership Project; Technical Specification Group Radio Access Network; "UTRAN Iur interface Radio Network Subsystem Application Part (RNSAP) signalling"; 3GPP TS 25.423 V8.12.0, (Release 8) , Jun. 2011; 1012 Pages.

(Continued)

*Primary Examiner* — Otis L Thompson, Jr.
(74) *Attorney, Agent, or Firm* — PERKINS COIE LLP

(57) ABSTRACT

A resource configuration method and apparatus, a terminal, and a non-transitory storage medium. The method includes: a terminal obtains configuration information, sent by a network side entity by means of radio resource control (RRC) signaling, of semi-persistent resources (S702), wherein the configuration information is used for indicating at least one of the following information: time information of retransmission resources, time offset position information of the retransmission resources with respect to initial transmission resources, time information of the initial transmission resources, the time information of the initial transmission resources associated with the retransmission resources; and the terminal performs, on the basis of the configuration information, data transmission by using the semi-persistent resources (S704).

12 Claims, 7 Drawing Sheets

A network side entity acquires second configuration information of a first semi-persistent resource — S302

The network side entity sends the second configuration information of the first semi-persistent resource to a terminal through a radio resource control (RRC) signaling — S304

The act S302 is an optional act, the network side entity may not need to acquire the second configuration information of the first semi-persistent resource again in a case that the network side entity already has the second configuration information of the first semi-persistent resource — S306

(56) References Cited

U.S. PATENT DOCUMENTS

| | | |
|---|---|---|
| 2017/0134935 A1 | 5/2017 | Wei |
| 2018/0160418 A1* | 6/2018 | Luo .................. H04W 72/1263 |
| 2018/0184444 A1* | 6/2018 | Li ......................... H04W 72/23 |
| 2019/0124669 A1* | 4/2019 | Luo ......................... H04W 4/40 |
| 2019/0239214 A1 | 8/2019 | Yang et al. |
| 2019/0261255 A1* | 8/2019 | You ......................... H04W 16/14 |
| 2019/0380125 A1 | 12/2019 | Yamamoto et al. |
| 2019/0394794 A1* | 12/2019 | Mali .................. H04W 74/0833 |
| 2020/0067664 A1* | 2/2020 | Kim ....................... H04L 5/0032 |
| 2020/0112484 A1* | 4/2020 | Sun ......................... H04L 5/003 |
| 2020/0275450 A1* | 8/2020 | Lee ..................... H04W 56/002 |
| 2020/0314960 A1* | 10/2020 | Basu Mallick ....... H04W 76/27 |
| 2020/0396749 A1* | 12/2020 | Zhou ..................... H04W 72/23 |
| 2021/0029703 A1* | 1/2021 | Zhou ......................... H04L 5/001 |
| 2021/0037561 A1* | 2/2021 | Lyu ..................... H04L 27/2626 |
| 2021/0195573 A1* | 6/2021 | Wang .................. H04W 88/04 |
| 2021/0195630 A1* | 6/2021 | Taherzadeh Boroujeni ................ H04W 72/0446 |
| 2022/0191915 A1* | 6/2022 | Lohr .................. H04L 27/2601 |
| 2023/0397206 A1* | 12/2023 | Deogun ................ H04L 5/0092 |

FOREIGN PATENT DOCUMENTS

| | | |
|---|---|---|
| CN | 107347212 A | 11/2017 |
| CN | 107708209 A | 2/2018 |
| CN | 108631920 A | 10/2018 |
| CN | 109286986 A | 1/2019 |
| CN | 109565864 A | 4/2019 |
| CN | 110050494 A | 7/2019 |
| CN | 110115080 A | 8/2019 |
| CN | 107347212 B | 11/2019 |
| CN | 110431910 A | 11/2019 |
| CN | 110574321 A | 12/2019 |
| EP | 3101969 A1 | 12/2016 |
| RU | 2672186 C2 | 11/2018 |
| WO | 2017052706 A1 | 3/2017 |
| WO | 2019210811 A1 | 11/2019 |

OTHER PUBLICATIONS

Notice of Allowance for Chinese Application No. 2022109399558 Issued Jan. 22, 2024, 10 Pages with English Translation.
Examination Report for European Application No. 20914443.5 issued on Apr. 20, 2023. 13 pages.
Decision to Grant for Russian Application No. 2022122112 issued on Apr. 3, 2023. 23 pages with English translation.
CATT "NR Uu Controlling LTE Sidelink SPS" R2-1912172; 3GPP TSN RAN WG2 Meeting #107bis; Chongqing; P.R. China; Oct. 14-18, 2019. 3 pages.
Examination Report for Indian Application No. 202227037753 issued Nov. 16, 2022. 5 pages with English translation.
Extended European Search Report for European Application No. 20914443.5 issued Oct. 28, 2022. 11 pages.
Futurewei "Support of NR Uu controlling LTE sidelink" R1-1910701; 3GPP TSG RAN WG1 Meeting #98bis; Chongqing; China; Oct. 14-20, 2019. 4 pages.
Huawei et al. "NR Uu control for LTE sidelink" R1-1906593; 3GPP TSG RAN WG1 Meeting #97; Reno, USA; May 13-17, 2019. 7 pages.
OPPO "On support of NR Uu controlling LTE sidelink" R1-1904925; 3GPP TSG-RAN WG1 Meeting #96bis; Xi'an, China; Apr. 8-12, 2019. 4 pages.
Office Action for Japanese Application No. 2022-542289 Issued Oct. 6, 2023, 6 Pages with English Translation.
First Office Action for Chinese Application No. 2022109399558 Issued Aug. 1, 2023, 17 Pages with English Translation.
Second Office Action for Chinese Application No. 2022109399558 Issued Oct. 26, 2023, 13 Pages with English Translation.
Fujitsu. "Dynamic Sidelink Bi-mode Transmission in NR-V2X 7.2.4.3" R1-1900253; 3GPP TSG-RAN WG1 Ad-Hoc Meeting 1901 Taipei, Taiwan, Jan. 21-25, 2019, 14 Pages.
Huawei, HiSilicon. "Discussion on Uu-based sidelink resource allocation/configuration" R1-1900028; 3GPP TSG RAN WG1 Ad-Hoc Meeting 1901, Taipei, Jan. 21-25, 2019; 14 Pages.
International Search Report Mailed Oct. 21, 2020 In Application No. PCT/CN2020/072994.
Vodafone, New SID: Study on NR V2X, 3GPP TSG RAN Meeting #80, RP-181429, La Jolla, USA, Jun. 11-14, 2018, 5 pages.
Written Opinion Mailed Oct. 21, 2020 In Application No. PCT/CN2020/072994, 8 pages.
Office Action of the IL application No. 294699, issued on Sep. 4, 2024. 3 pages.
Office Action of the SG application No. 11202251173F, issued on Nov. 25, 2024. 9 pages.
Notice of Preliminary Rejection of the Korean application No. 10-2022-7023212, issued on Mar. 10, 2025. 8 pages with English translation.
R1-1901949, Fujitsu, Dynamic Sidelink Bi-mode Transmission in NR-V2X, 3GPP TSG RAN WG1 #96, Athens, Greece, Feb. 25-Mar. 1, 2019. 14 pages.
R1-1900889, Qualcomm Incorporated, Enhancements of LTE Uu and NR Uu to control NR sidelink, 3GPP TSG RAN WG1 #AH, Taipei, Taiwan, Jan. 21-25, 2019. 4 pages.

* cited by examiner

RESOURCE CONFIGURATION METHOD AND APPARATUS, TERMINAL, AND NON-VOLATILE STORAGE MEDIUM

CROSS-REFERENCE TO RELATED APPLICATION

The present application is a continuation application of International PCT Application No. PCT/CN2020/072994, filed on Jan. 19, 2020, the entire content of which is hereby incorporated by reference.

TECHNICAL FIELD

The present disclosure relates to the field of communications, and particularly, to a method and an apparatus for resource configuration, a terminal, and a non-transitory storage medium.

BACKGROUND

At present, for a sidelink, in Long Term Evolution (LTE), semi-persistent resources are configured usually in a Downlink Control Information (DCI) signaling. A User Equipment (UE) may calculate transmission information of the semi-persistent resources.

In a New Radio (NR) system, configuration of the semi-persistent resources is implemented usually by scheduling dynamically configuration information for the semi-persistent resources in the DCI signaling. The UE may calculate transmission information of the semi-persistent resources.

For a scenario of cross-radio access type (RAT) scheduling, that is, a scenario in which an LTE user equipment interface (Uu interface) schedules an NR PC5 interface, resource scheduling performed on the sidelink using the DCI signaling is not supported, so resource configuration is difficult to implement.

Therefore, although the aforementioned mode of configuring the semi-persistent resources may be configured by the DCI signaling, resources are difficult to configure in a case in which there is no DCI signaling or using of the DCI signaling is not supported.

No effective solution to the above problem has been proposed at present yet.

SUMMARY

An implementation of the present disclosure provides a method and an apparatus for resource configuration, a terminal, and a non-transitory storage medium.

According to one aspect of the implementations of the present disclosure, a method for resource configuration is provided. The method may include: acquiring, by a terminal, configuration information of a semi-persistent resource sent by a network side entity through a radio resource control (RRC) signaling, wherein the configuration information is used for indicating at least one piece of following information: time information of a retransmission resource, time offset position information of the retransmission resource relative to an initial transmission resource, time information of the initial transmission resource, or time information of an initial transmission resource associated with the retransmission resource; and transmitting, by the terminal, data using the semi-persistent resource based on the configuration information.

According to another aspect of the implementations of the present disclosure, a method for resource configuration is further provided. The method may include: acquiring, by a terminal, configuration information of a resource, wherein the configuration information includes time information of an initial transmission resource of the resource, and a time indicated by time information of a resource used for retransmission of the Nth initial transmission resource is earlier than a time indicated by time information of the (N+1)th initial transmission resource, wherein N is a natural number greater than 0; and transmitting, by the terminal, data using the resource based on the time information.

According to another aspect of the implementations of the present disclosure, a terminal is further provided. The terminal may include a first signal receiving module, configured to cause the terminal to acquire configuration information of a semi-persistent resource sent by a network side entity through a radio resource control (RRC) signaling, wherein the configuration information is used for indicating at least one piece of following information: time information of a retransmission resource, time offset position information of the retransmission resource relative to an initial transmission resource, time information of the initial transmission resource, or time information of an initial transmission resource associated with the retransmission resource; and a first signal transmitting module, configured to cause the terminal to transmit data using the semi-persistent resource based on the configuration information.

According to another aspect of the implementations of the present disclosure, a terminal is provided. The terminal may include a second signal receiving module, configured to cause the terminal to acquire configuration information of a resource, wherein the configuration information includes time information of an initial transmission resource of the resource, and a time indicated by time information of a resource used for retransmission of the Nth initial transmission resource is earlier than a time indicated by time information of the (N+1)th initial transmission resource, wherein N is a natural number greater than 0; and a second signal transmitting module, configured to cause the terminal to transmit data using the resource based on the time information.

According to another aspect of the implementations of the present disclosure, an apparatus for resource configuration is provided. The apparatus may include: a first acquiring unit, configured to cause a terminal to acquire configuration information of a semi-persistent resource sent by a network side entity through a radio resource control (RRC) signaling, wherein the configuration information is used for indicating at least one piece of following information: time information of a retransmission resource, time offset position information of the retransmission resource relative to an initial transmission resource, time information of the initial transmission resource, or time information of an initial transmission resource associated with the retransmission resource; and a first transmitting unit, configured to cause the terminal to transmit data using the semi-persistent resource based on the configuration information.

According to another aspect of the implementations of the present disclosure, another apparatus for resource configuration is further provided. The apparatus may include: a second acquiring unit, configured to cause a terminal to acquire configuration information of a resource, wherein the configuration information includes time information of an initial transmission resource of the resource, and a time indicated by time information of a resource used for retransmission of the Nth initial transmission resource is earlier than a time indicated by time information of the (N+1)th initial transmission resource, wherein N is a natural number greater than 0; and a second transmitting unit, configured to cause the terminal to transmit data using the resource based on the time information.

According to another aspect of the implementations of the present disclosure, another method for resource configuration is further provided. The method may include: sending, by a network side entity, configuration information of a semi-persistent resource to a terminal through a radio resource control (RRC) signaling, wherein the configuration information is used for causing the terminal to transmit data using the semi-persistent resource, and the configuration information is used for indicating at least one piece of following information: time information of a retransmission resource, time offset position information of the retransmission resource relative to an initial transmission resource, time information of the initial transmission resource, or time information of an initial transmission resource associated with the retransmission resource.

According to another aspect of the implementations of the present disclosure, another apparatus for resource configuration is further provided. The apparatus may include: a sending unit, configured to cause a network side entity to send configuration information of a semi-persistent resource to a terminal through a radio resource control (RRC) signaling, wherein the configuration information is used for causing the terminal to transmit data using the semi-persistent resource, and the configuration information is used for indicating at least one piece of following information: time information of a retransmission resource, time offset position information of the retransmission resource relative to an initial transmission resource, time information of the initial transmission resource, or time information of an initial transmission resource associated with the retransmission resource.

According to another aspect of the implementations of the present disclosure, a non-transitory storage medium is provided. The non-transitory storage medium includes a stored program, which, when being run, controls a device, in which the non-transitory storage medium is located, to perform the method for resource configuration in accordance with an implementation of the present disclosure.

According to another aspect of the implementations of the present disclosure, a terminal device is provided. The terminal device includes a memory and a processor. A computer program is stored in the memory, and the processor is configured to run the computer program to execute the method for resource configuration in accordance with an implementation of the present disclosure.

BRIEF DESCRIPTION OF DRAWINGS

The drawings depicted herein are intended to provide further understanding of the present disclosure and form a part of the present disclosure. Exemplary implementations of the present disclosure and the description thereof are intended to explain the present disclosure and do not constitute an improper limitation to the present disclosure. In the drawings.

DETAILED DESCRIPTION

Figure 1:
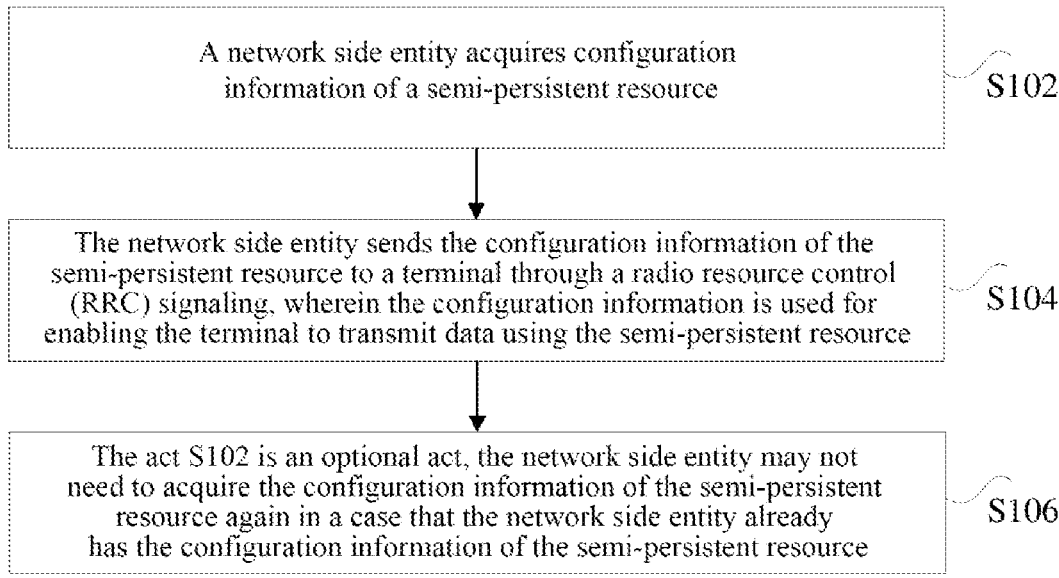
FIG. 1 is a flowchart of a method for resource configuration in accordance with an implementation of the present disclosure.

In order to enable a person skilled in the art to better understand solutions of the present disclosure, technical solutions in implementations of the present disclosure will be described clearly and completely below in combination with the drawings in the implementations of the present disclosure. It is apparent that the described implementations are only a part, but not all, of the implementations of the present disclosure. Based on the implementations of the present disclosure, all other implementations achieved by a person of ordinary skill in the art without making inventive efforts should belong to the protection scope of the present disclosure.

It should be noted that the terms "first", "second", and the like in the specification, claims and the drawings of the present disclosure are intended to distinguish similar objects and not necessarily intended to describe a specific order or a precedence order. It should be understood that data thus used may be interchanged in an appropriate case so that the implementations of the present disclosure described herein can be implemented in an order other than that illustrated or described herein. In addition, the terms "include", "have", and any variations thereof are intended to cover non-exclusive inclusion, for example, processes, methods, systems, products, or devices that include a series of acts or units are not necessarily limited to those acts or units clearly listed, but may include other acts or units that are not clearly listed or inherent to these processes, methods, products, or devices.

According to an implementation of the present disclosure, an implementation of a method for resource configuration is provided. It should be noted that acts illustrated in a flowchart of the drawing may be performed in a computer system such as a set of computer executable instructions, and although a logical order is shown in the flowchart, in some cases the acts shown or described may be performed in a different order than the order herein.

Methods for configuring a resource in accordance with the implementations of the present disclosure will be introduced below from a network side entity.

FIG. 1 is a flowchart of a method for resource configuration in accordance with an implementation of the present disclosure. As shown in FIG. 1, the method may include following acts S102 and S104.

In the act S102, a network side entity acquires configuration information of a semi-persistent resource.

In the act S104, the network side entity sends the configuration information of the semi-persistent resource to a terminal through a radio resource control (RRC) signaling, wherein the configuration information is used for causing the terminal to transmit data using the semi-persistent resource, and the configuration information is used for indicating at least one piece of following information: time information of a retransmission resource, time offset position information of the retransmission resource relative to an initial transmission resource, time information of the initial transmission resource, or time information of an initial transmission resource associated with the retransmission resource, wherein the semi-persistent resource include the initial transmission resource and the retransmission resource, wherein the initial transmission resource is a resource for initial transmission, and the retransmission resource is a resource for retransmission.

In the technical solution provided by the above acts of the present disclosure, the network side entity, which may be a base station in Device to Device (D2D) communication, may be used for allocating a transmission resource to the terminal to cause the terminal to transmit the data according to the allocated transmission resource. The transmission resource, which may be a semi-persistentally transmitted resource, that is, a semi-persistent resource, may implement the D2D communication in Mode A. The network side entity in this implementation acquires the configuration information of the semi-persistent resource, and may send the configuration information of the semi-persistent resource to the terminal through the radio resource control (RRC) signaling.

After the terminal receives the configuration information, the configuration information may be used for causing the terminal to transmit the data using the semi-persistent resource. In this implementation, unlike a mode of receiving or sending communication data by a base station in a traditional cellular system, a terminal-to-terminal direct communication mode may be used in this implementation, and this may cause the terminal to transmit the data to another terminal using the semi-persistent resource based on the configuration information, implementing the D2D communication with another terminal, and further achieving the purpose of having relatively high spectrum efficiency and relatively low transmission delay.

In an act S106, the act S102 is an optional act, the network side entity may not need to acquire the configuration information of the semi-persistent resource again in a case that the network side entity already has the configuration information of the semi-persistent resource.

In the method for resource configuration at the network side entity side in accordance with an implementation of the present disclosure, the network side entity sends the configuration information of the semi-persistent resource to the terminal through the radio resource control (RRC) signaling, so that the terminal transmits the data using the semi-persistent resource based on the configuration information, thus in a case that a DCI signaling exists, the DCI signaling may be used for implementing an operation other than resource configuration, while it is not limited to be that the resource configuration is implemented only through the DCI signaling. Even in a scenario in which no DCI signaling can be used or using of the DCI signaling is not supported, the resource configuration may also be implemented through the RRC signaling, thereby solving the technical problem that the resource configuration is difficult to perform without the DCI signaling, and achieving the technical effect that the resource configuration may also be implemented without the DCI signaling.

The method of this implementation will be further described in detail below.

As an optional implementation, in the act S104, the network side entity sends the configuration information of the semi-persistent resource to the terminal through the radio resource control (RRC) signaling, including: the network side entity sends first configuration information of a first semi-persistent resource to the terminal through the RRC signaling, wherein the first semi-persistent resource includes the initial transmission resource and the retransmission resource, the first configuration information includes first time information of the initial transmission resource and/or second time information of the retransmission resource, and the first time information and/or the second time information are used for causing the terminal to transmit the data using the first semi-persistent resource.

Figure 2:
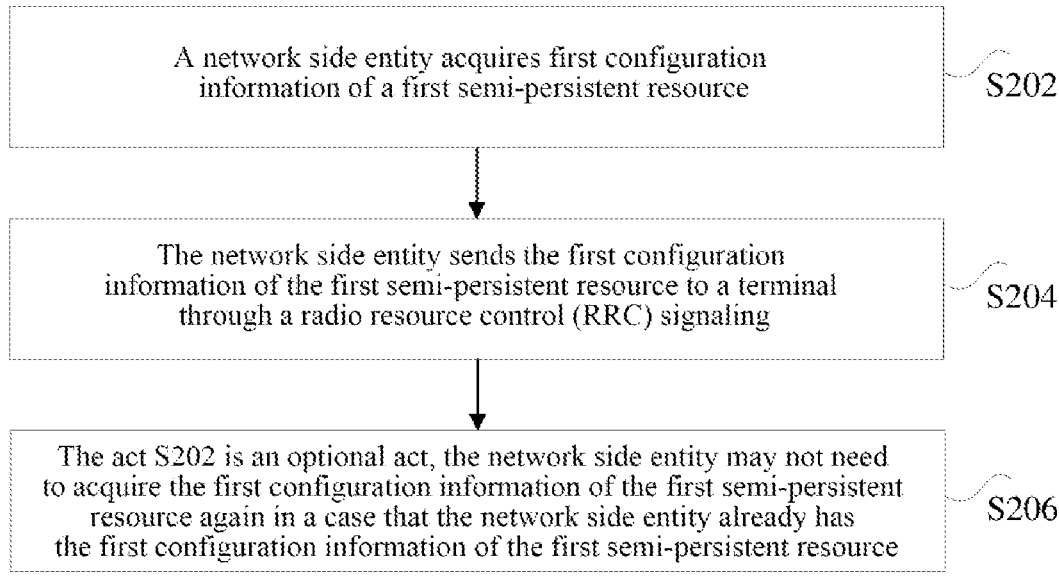
FIG. 2 is a flowchart of another method for resource configuration in accordance with an implementation of the present disclosure.

FIG. 2 is a flowchart of another method for resource configuration in accordance with an implementation of the present disclosure. As shown in FIG. 2, the method may include following acts S202 and S204.

In the act S202, a network side entity acquires first configuration information of a first semi-persistent resource.

In the act S204, the network side entity sends the first configuration information of the first semi-persistent resource to a terminal through a radio resource control (RRC) signaling.

In the technical solution provided by the above acts of the present disclosure, the first semi-persistent resource may include an initial transmission resource and a retransmission resource, and the first configuration information includes first time information of the initial transmission resource and/or second time information of the retransmission resource, wherein the first time information and/or the second time information are used for causing the terminal to transmit data using the first semi-persistent resource.

In this implementation, the network side entity acquires the first configuration information of the first semi-persistent resource, and may send the first configuration information for the first semi-persistent resource to the terminal through the RRC signaling. The first configuration information includes first time information for the initial transmission resource, and the first time information includes transmission time of the initial transmission resource and may indicate a position of the transmission time of the initial transmission resource on the time axis, wherein the initial transmission resource is a semi-persistent resource for initial transmission in the first semi-persistent resource. Optionally, the first configuration information in this implementation may also include second time information for the retransmission resource, and the second time information includes transmission time of the retransmission resource and may indicate a position of the transmission time of the retransmission resource on the time axis, wherein the retransmission resource is a semi-persistent resource for retransmission in the first semi-persistent resource, and exists based on the initial transmission resource, that is, the retransmission resource may be a retransmission resource of the initial transmission resource, so that it is implemented that the second time information of the retransmission resource is indicated through the RRC signaling within the same first semi-persistent resource configuration.

After the terminal receives the first time information and/or the second time information, the first time information and/or the second time information may be used for causing the terminal to transmit the data using the first semi-persistent resource. In this implementation, unlike a mode of receiving or sending communication data by a base station in the traditional cellular system, a terminal-to-terminal direct communication mode may be used in this implementation, and this may cause the terminal to transmit the data to another terminal using the first semi-persistent resource, implementing D2D communication with another terminal, and further achieving the purpose of having relatively high spectrum efficiency and relatively low transmission delay.

In an act S206, the act S202 is an optional act, the network side entity may not need to acquire the first configuration information of the first semi-persistent resource again in a case that the network side entity already has the first configuration information of the first semi-persistent resource.

The above method of this implementation will be further introduced below.

As an optional implementation, a time indicated by time information of a resource used for retransmission of the Nth initial transmission resource is earlier than a time indicated by first time information of the (N+1)th initial transmission resource, wherein N is a natural number greater than 0.

In this implementation, for the solution that the time information of the retransmission resource is indicated through the RRC signaling within the same first semi-persistent resource configuration, there may be multiple initial transmission resources in the first semi-persistent resource, the time indicated by the time information of the resource used for retransmission of the Nth initial transmission resource may be denoted by A, and the time indicated by the first time information of the (N+1)th initial transmission resource may be denoted by B. A should be earlier than B, that is, the resource used for retransmission of the Nth initial transmission resource cannot be later than the (N+1)th initial transmission resource in time, thus the terminal may transmit the data normally based on the resource used for retransmission of the Nth initial transmission resource, and the (N+1)th initial transmission resource in turn, to avoid a restriction on reservation of the retransmission resource caused by processing one semi-persistent resource using one Hybrid Automatic Repeat reQuest (HARQ) process.

As an optional implementation, the method further includes: it is implemented that the time indicated by the time information of the resource used for retransmission of the Nth initial transmission resource is earlier than the time indicated by the time information of the (N+1)th initial transmission resource by at least one of following modes: limiting the maximum time range of reservation of the resource used for retransmission of the Nth initial transmission resource; or limiting the maximum number of times of reservation of the resource used for retransmission of the Nth initial transmission resource.

In this implementation, reservation of the resource used for retransmission of the Nth initial transmission resource has a certain time range, and in this implementation, the maximum time range of reservation of the resource used for retransmission of the Nth initial transmission resource may be limited, and the upper limit time and the lower limit time of the maximum time range may be set, so that it is implemented that the time indicated by the time information of the resource used for retransmission of the Nth initial transmission resource is earlier than the time indicated by the time information of the (N+1)th initial transmission resource. Optionally, the resource for retransmission of the Nth initial transmission resource in this implementation has a number of times of reservation, and in this implementation, the maximum number of times of reservation of the resource used for retransmission of the Nth initial transmission resource may also be limited, and the upper limit number of times and the lower limit number of times of the maximum number of times may be set, so that the time indicated by the time information of the resource used for retransmission of the Nth initial transmission resource is earlier than the time indicated by the time information of the (N+1)th initial transmission resource.

As an optional implementation, the first time information and/or the second time information are used for causing the terminal to transmit the data using the first semi-persistent resource on a sidelink.

In this implementation, device-to-device communication is a sidelink (SL) transmission technology based on D2D, and the terminal may send the data on the sidelink according to the resource allocated by the base station. In this implementation, for the solution that the time information of the retransmission resource is indicated through the RRC signaling within the same first semi-persistent resource configuration, after the network side entity sends the first configuration information to the terminal, the first time information and/or the second time information may cause the terminal to transmit the data on the sidelink using the first semi-persistent resource, for example, the first time information and/or the second time information may cause the terminal to transmit the data to another terminal on the sidelink using the first semi-persistent resource, thereby implementing a semi-persistent resource configuration mechanism for the sidelink, and implementing the technical effect that the terminal transmits the data without depending on the DCI signaling.

As an optional implementation, in the act S204, the network side entity sends the first configuration information of the first semi-persistent resource to the terminal through the radio resource control (RRC) signaling, including: the network side entity sends the first configuration information under a second radio access type (RAT) to the terminal through the RRC signaling under a first radio access type.

In this implementation, when it is implemented that the network side entity sends the first configuration information of the first semi-persistent resource to the terminal through the radio resource control (RRC) signaling, the network side entity may send the first configuration information under the second radio access type (RAT) to the terminal through the RRC signaling under the first radio access type, so as to achieve the purpose of configuring the initial transmission resource and the retransmission resource in a cross-RAT scenario at the same time. Therefore, for a scenario of cross-RAT scheduling, that is, a scenario in which an LTE user equipment interface (Uu) schedules a new interface between radio vehicles (NR PC5), even if there is no DCI signaling, sidelink resource scheduling may also be performed.

As an optional implementation, the network side entity is in a vehicle-to-everything (V2X) system.

In this implementation, for the solution that the time information of the retransmission resource is indicated through the RRC signaling within the same first semi-persistent resource configuration, the network side entity may be applied in the vehicle-to-everything system. Herein, in Rel-14/15, the vehicle-to-everything system has been studied for a scenario of vehicle-to-vehicle communication. It mainly faces services of relatively high-speed moving vehicle-to-vehicle and vehicle-to-person communications, so that a mechanism of sidelink channel semi-persistent resource configuration in the vehicle-to-everything system can be implemented by the above method, thereby further achieving the purpose of configuring the initial transmission resource and the retransmission resource in the cross-RAT scenario at the same time.

An implementation of the present disclosure further provides another method of sending the configuration information of the semi-persistent resource to the terminal through the radio resource control (RRC) signaling by the network side entity.

As an optional implementation, in the act S204, the network side entity sends the configuration information of the semi-persistent resource to the terminal through the radio resource control (RRC) signaling, including: the network side entity sends second configuration information of the first semi-persistent resource to the terminal through the RRC signaling, wherein the second configuration information is used for causing the terminal to transmit the data using the first semi-persistent resource, the second configuration information including the first time information of the initial transmission resource and third time information of the retransmission resource.

Figure 3:
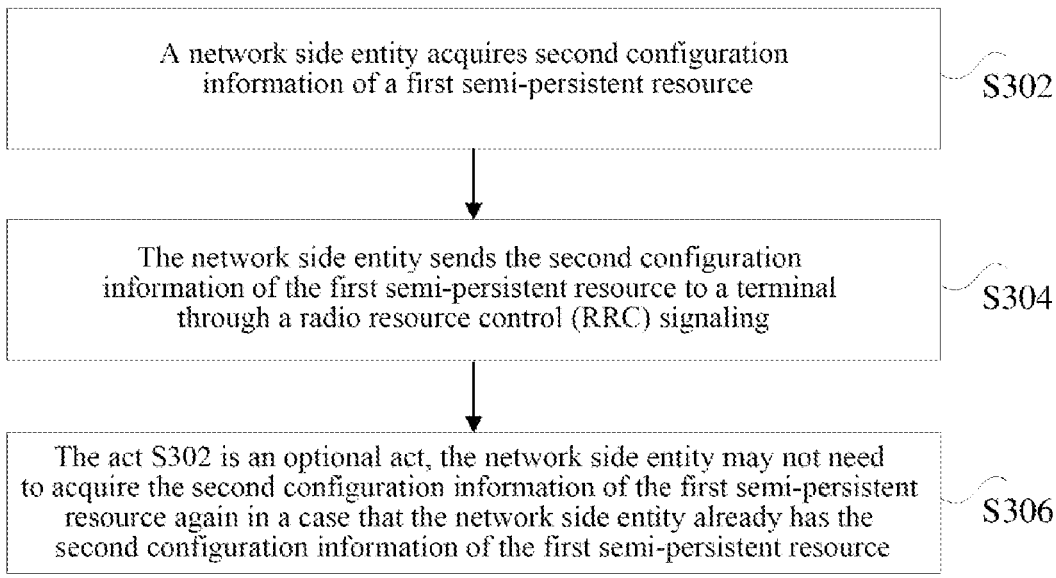
FIG. 3 is a flowchart of another method for resource configuration in accordance with an implementation of the present disclosure.

FIG. 3 is a flowchart of another method for resource configuration in accordance with an implementation of the present disclosure. As shown in FIG. 3, the method may include following acts S302 and S304.

In the act S302, a network side entity acquires second configuration information of a first semi-persistent resource.

In the act S304, the network side entity sends the second configuration information of the first semi-persistent resource to a terminal through a radio resource control (RRC) signaling.

In the technical solution provided by the above acts of the present disclosure, the second configuration information is used for causing the terminal to transmit data using the first semi-persistent resource, and the second configuration information includes first time information of an initial transmission resource and third time information of a retransmission resource.

The network side entity in this implementation acquires the second configuration information of the first semi-persistent resource, and may send the second configuration information of the first semi-persistent resource to the terminal through the RRC signaling, wherein the second configuration information includes the first time information of the initial transmission resource used for initial transmission, and the first time information includes transmission time of the initial transmission resource, and may indicate a position of the transmission time of the initial transmission resource on the time axis. Optionally, the second configuration information in an implementation may also include third time information of the retransmission resource used for retransmission, and the third time information includes transmission time of the retransmission resource, and may indicate a position of the transmission time of the retransmission resource on the time axis, and may also include time offset position information of the retransmission resource, wherein the retransmission resource in this implementation may be a retransmission resource of the initial transmission resource.

After the terminal receives the second configuration information, the second configuration information may be used for causing the terminal to transmit the data using the first semi-persistent resource, and may cause the terminal to transmit the data to another terminal using the first semi-persistent resource, implementing D2D communication with another terminal, and further achieving the purpose of having relatively high spectrum efficiency and relatively low transmission delay.

In an act S306, the act S302 is an optional act, the network side entity may not need to acquire the second configuration information of the first semi-persistent resource again in a case that the network side entity already has the second configuration information of the first semi-persistent resource.

The above method of this implementation will be further introduced below.

As an optional implementation, the third time information of the retransmission resource includes first time offset position information of the retransmission resource relative to the initial transmission resource.

In this implementation, the third time information of the retransmission resource, which includes the first time offset position information of the retransmission resource relative to the initial transmission resource, may be used for indicating an offset of time corresponding to the retransmission resource relative to time corresponding to the initial transmission resource, so as to implement that the offset of the time corresponding to the retransmission resource relative to the time corresponding to the initial transmission resource is indicated through the RRC signaling within the same first semi-persistent resource configuration.

As an optional implementation, the first time information and the first time offset position information are used for causing the terminal to determine second time information of the retransmission resource, the third time information further includes the second time information, and the first time information and/or the second time information are used for causing the terminal to transmit the data using the first semi-persistent resource.

In this implementation, the third time information of the retransmission resource includes not only the first time offset position information of the retransmission resource relative to the initial transmission resource, but also the second time information of the retransmission resource. The second time information includes retransmission time of the retransmission resource and may indicate a position of transmission time of the retransmission resource on the time axis, and the first time information and the first time offset position information may be used for determining the second time information of the retransmission resource by the terminal.

As an optional implementation, the first time information and/or the second time information are used for causing the terminal to transmit the data on the sidelink using the first semi-persistent resource.

In this implementation, device-to-device communication is a sideline link transmission technology based on D2D, and the terminal may send the data on the sidelink according to the resource allocated by a base station. In this implementation, for the solution that the time offset of the retransmission resource relative to the initial resource is indicated through the RRC signaling within the same first semi-persistent resource configuration, after the network side entity sends the second configuration information to the terminal, the first time information and/or the second time information may cause the terminal to transmit the data on the sidelink using the first semi-persistent resource, for example, the first time information and/or the second time information may cause the terminal to transmit the data to another terminal on the sidelink using the first semi-persistent resource, thereby implementing a semi-persistent resource configuration mechanism for the sidelink, and implementing the technical effect that the terminal transmits the data without depending on the DCI signaling.

As an optional implementation, a time indicated by time information of a resource used for retransmission of the Nth initial transmission resource is earlier than a time indicated by first time information of the (N+1)th initial transmission resource, wherein N is a natural number greater than 0.

In this implementation, for the solution that the time offset of the retransmission resource relative to the initial transmission resource is indicated through the RRC signaling within the same semi-persistent resource configuration, there may be multiple initial transmission resources in the first semi-persistent resource, the time indicated by the time information of the resource used for retransmission of the Nth initial transmission resource may be denoted by A, and the time indicated by the first time information of the (N+1)th initial transmission resource may be denoted by B. A should be earlier than B, that is, the resource used for retransmission of the Nth initial transmission resource cannot be later than the (N+1)th initial transmission resource in time, thus the terminal may transmit the data normally based on the resource used for retransmission of the Nth initial transmission resource, and the (N+1)th initial transmission resource in turn, to avoid a restriction on reservation of the resource used for retransmission of the Nth initial transmission resource caused by processing one semi-persistent resource using one HARQ process.

As an optional implementation, the method further includes: it is implemented that the time indicated by the time information of the resource used for retransmission of the Nth initial transmission resource is earlier than the time indicated by the time information of the (N+1)th initial transmission resource by at least one of following modes: limiting the maximum time range of reservation of the resource used for retransmission of the Nth initial transmission resource; or limiting the maximum number of times of reservation of the resource used for retransmission of the Nth initial transmission resource.

In this implementation, for the solution that the time offset of the retransmission resource relative to the initial transmission resource is indicated through the RRC signaling within the same semi-persistent resource configuration, reservation of the resource used for retransmission of the Nth initial transmission resource has a certain time range, the maximum time range of reservation of the resource used for retransmission of the Nth initial transmission resource may be limited, and the upper limit time and the lower limit time of the maximum time range may be set, so that it is implemented that the time indicated by the time information of the resource used for retransmission of the Nth initial transmission resource is earlier than the time indicated by the time information of the (N+1)th initial transmission resource. Optionally, the retransmission resource have a number of times of reservation, and in this implementation, the maximum number of times of reservation of the resource used for retransmission of the Nth initial transmission resource may also be limited, and the upper limit number of times and the lower limit number of times of the maximum number of times may be set, so that the time indicated by the time information of the resource used for retransmission of the Nth initial transmission resource is earlier than the time indicated by the time information of the (N+1)th initial transmission resource.

As an optional implementation, in the act S304, the network side entity sends the second configuration information of the first semi-persistent resource to the terminal through the radio resource control (RRC) signaling, including: the network side entity sends the second configuration information under a second radio access type (RAT) to the terminal through the RRC signaling under a first radio access type.

In this implementation, for the solution that the time offset of the retransmission resource relative to the initial transmission resource is indicated through the RRC signaling within the same semi-persistent resource configuration, when it is implemented that the network side entity sends the second configuration information of the first semi-persistent resource to the terminal through the radio resource control (RRC) signaling, the network side entity may send the second configuration information under the second radio access type (RAT) to the terminal through the RRC signaling under the first radio access type, so as to achieve the purpose of configuring the initial transmission resource and the retransmission resource in a cross-RAT scenario at the same time. Therefore, for a scenario of cross-RAT scheduling, that is, a scenario in which an LTE Uu interface schedules NR PC5, even if there is no DCI signaling, sidelink resource scheduling may also be performed.

As an optional implementation, the network side entity is in a vehicle-to-everything system.

In this implementation, for the solution that the time offset of the retransmission resource relative to the initial transmission resource is indicated through the RRC signaling within the same semi-persistent resource configuration, the network side entity may be applied in the vehicle-to-everything system, so that a mechanism of sidelink channel semi-persistent resource configuration in the vehicle-to-everything system can be implemented by the above method in this implementation, thereby further achieving the purpose of configuring the initial transmission resource and the retransmission resource in the cross-RAT scenario at the same time.

An implementation of the present disclosure further provides another method of sending the configuration information of the semi-persistent resource to the terminal through the radio resource control (RRC) signaling by the network side entity.

As an optional implementation, in the act S104, the network side entity sends the configuration information of the semi-persistent resource to the terminal through the radio resource control (RRC) signaling, including: the network side entity sends third configuration information of the first semi-persistent resource and fourth configuration information of a second semi-persistent resource to the terminal through the RRC signaling, wherein the third configuration information includes the first time information of the first semi-persistent resource used for initial transmission, the fourth configuration information includes fourth time information of the second semi-persistent resource used for retransmission, the first semi-persistent resource is associated with the second semi-persistent resource, the first time information is used for causing the terminal to transmit data using the first semi-persistent resource, and the fourth time information is used for causing the terminal to transmit data using the second semi-persistent resource.

Figure 4:
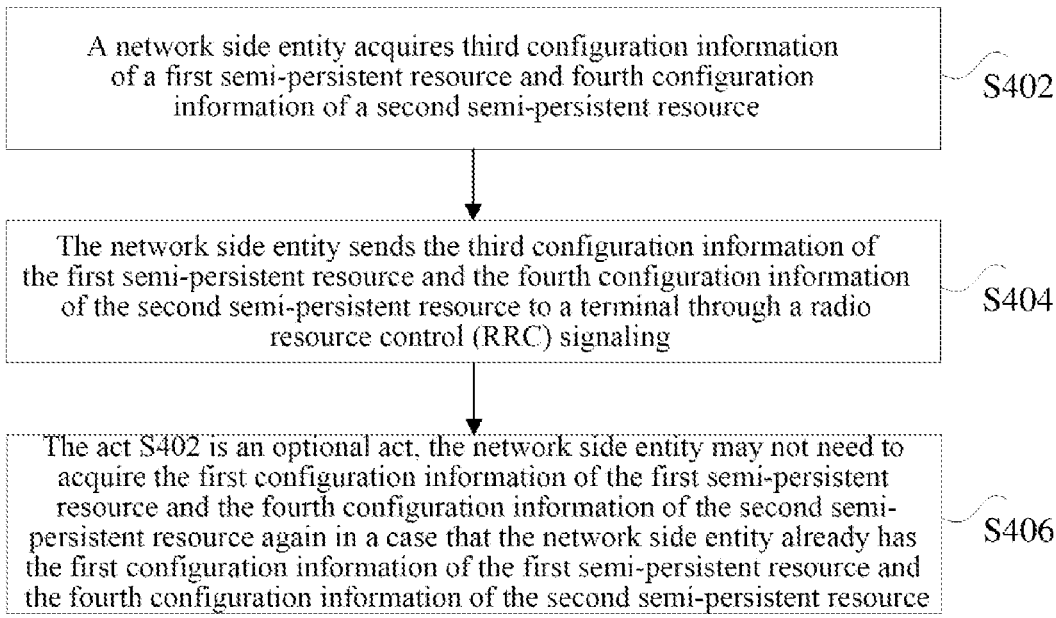
FIG. 4 is a flowchart of another method for resource configuration in accordance with an implementation of the present disclosure.

FIG. 4 is a flowchart of another method for resource configuration in accordance with an implementation of the present disclosure. As shown in FIG. 4, the method may include following acts S402 and S404.

In the act S402, a network side entity acquires third configuration information of a first semi-persistent resource and fourth configuration information of a second semi-persistent resource.

In the act S404, the network side entity sends the third configuration information of the first semi-persistent resource and the fourth configuration information of the second semi-persistent resource to a terminal through a radio resource control (RRC) signaling.

In the technical solution provided by the above acts of the present disclosure, the third configuration information includes first time information of the first semi-persistent resource used for initial transmission, the fourth configuration information includes fourth time information of the second semi-persistent resource used for retransmission, wherein the first semi-persistent resource is associated with the second semi-persistent resource, the association herein may mean that the second semi-persistent resource is a retransmission resource of the first semi-persistent resource, and the first semi-persistent resource is an initial transmission resource of the second semi-persistent resource, wherein the first time information is used for causing the terminal to transmit data using the first semi-persistent resource, and the fourth time information is used for causing the terminal to transmit data using the second semi-persistent resource.

In this implementation, the network side entity acquires the third configuration information of the first semi-persistent resource and the fourth configuration information of the second semi-persistent resource, and may send the third configuration information for the first semi-persistent resource and the fourth configuration information of the second semi-persistent resource to the terminal through the RRC signaling, wherein the third configuration information includes the first time information for the initial transmission resource, and the first time information includes transmission time of the initial transmission resource, and may include a position of the transmission time of the initial transmission resource on the time axis, wherein the initial transmission resource is a semi-persistent resource used for initial transmission in the first semi-persistent resource. Optionally, the fourth configuration information in this implementation may include the fourth time information of the second semi-persistent resource used for retransmission, the first semi-persistent resource is associated with the second semi-persistent resource, and the second time information includes transmission time of the second semi-persistent resource, and may include a position of the transmission time of the second semi-persistent resource on the time axis, such that it is implemented that time information of the second semi-persistent resource for retransmission is indicated through the RRC signaling within different semi-persistent resources.

After the terminal receives the third configuration information and the fourth configuration information, the first time information is used for causing the terminal to transmit the data using the first semi-persistent resource, and the fourth time information is used for causing the terminal to transmit the data using the second semi-persistent resource. In this implementation, unlike a mode of receiving or sending communication data by a base station in the traditional cellular system, a terminal-to-terminal direct communication mode may be used in this implementation, and this may cause the terminal to transmit the data to another terminal using the first semi-persistent resource or the data may also be transmitted to another terminal using the second semi-persistent resource, thereby implementing D2D communication with another terminal, and further achieving the purpose of having relatively high spectrum efficiency and relatively low transmission delay.

In an act S406, the act S402 is an optional act, the network side entity may not need to acquire the first configuration information of the first semi-persistent resource and the fourth configuration information of the second semi-persistent resource again in a case that the network side entity already has the first configuration information of the first semi-persistent resource and the fourth configuration information of the second semi-persistent resource.

In this implementation, the time information of the second semi-persistent resource for retransmission is indicated through the RRC signaling within different semi-persistent resources and is sent to the terminal, thereby solving the technical problem that resource configuration is difficult to perform without a DCI signaling, and further achieving the technical effect that resource configuration can be performed without the DCI signaling.

The above method of this implementation will be further introduced below.

As an optional implementation, the method further includes: the network side entity sends association information of the first semi-persistent resource and the second semi-persistent resource to the terminal, wherein the association information is used for indicating that the first semi-persistent resource is used for initial transmission and the second semi-persistent resource is used for retransmission.

In this implementation, there is a certain association relationship between the first semi-persistent resource and the second semi-persistent resource. In addition to sending the first configuration information of the first semi-persistent resource and second configuration information of the second semi-persistent resource to the terminal, the network side entity may also send the association information of the first semi-persistent resource and the second semi-persistent resource to the terminal, and may indicate to the terminal through the association information that the first semi-persistent resource is used for initial transmission and the second semi-persistent resource is used for retransmission.

As an optional implementation, a time indicated by time information of a resource used for retransmission of the Nth initial transmission resource in the first semi-persistent resource is earlier than a time indicated by first time information of the (N+1)th initial transmission resource, wherein N is a natural number greater than 0.

In this implementation, for the solution that the time information of the second semi-persistent resource for retransmission and time information of an associated initial transmission resource are indicated through the RRC signaling within different semi-persistent resources, there may be multiple initial transmission resources in the first semi-persistent resource, the time indicated by the time information of the resource used for retransmission of the Nth initial transmission resource may be denoted by A, and the time indicated by the first time information of the (N+1)th initial transmission resource may be denoted by B. A should be earlier than B, that is, the resource used for retransmission of the Nth initial transmission resource cannot be later than the (N+1)th initial transmission resource in time, thus the terminal may transmit the data normally based on the resource used for retransmission of the Nth initial transmission resource and the (N+1)th initial transmission resource in turn, to avoid a restriction on reservation of the retransmission resource caused by processing one semi-persistent resource using one HARQ process.

As an optional implementation, the method further includes: it is implemented that the time indicated by the time information of the resource used for retransmission of the Nth initial transmission resource is earlier than the time indicated by the time information of the (N+1)th initial transmission resource by at least one of following modes: limiting the maximum time range of reservation of the resource used for retransmission of the Nth initial transmission resource; or limiting the maximum number of times of reservation of the resource used for retransmission of the Nth initial transmission resource.

In this implementation, for the solution that the time information of the second semi-persistent resource for retransmission and the time information of the associated initial transmission resource are indicated through the RRC signaling within different semi-persistent resources, reservation of the resource used for retransmission of the Nth initial transmission resource has a certain time range, the maximum time range of reservation of the resource used for retransmission of the Nth initial transmission resource may be limited, and the upper limit time and the lower limit time of the maximum time range may be set, so that it is implemented that the time indicated by the time information of the resource used for retransmission of the Nth initial transmission resource is earlier than the time indicated by the time information of the (N+1)th initial transmission resource. Optionally, the retransmission resource has a number of times of reservation, and in this implementation, the maximum number of times of reservation of the resource used for retransmission of the Nth initial transmission resource may also be limited, and the upper limit number of times and the lower limit number of times of the maximum number of times may be set, so that the time indicated by the time information of the resource used for retransmission of the Nth initial transmission resource is earlier than the time indicated by the time information of the (N+1)th initial transmission resource.

As an optional implementation, the first time information is used for causing the terminal to transmit the data on a sidelink using the first semi-persistent resource, and the fourth time information is used for causing the terminal to transmit the data on the sidelink using the second semi-persistent resource.

In this implementation, for the solution that time information of the second semi-persistent resource for retransmission and the time information of the associated initial transmission resource are indicated through the RRC signaling within different semi-persistent resources, after the network side entity sends the third configuration information of the first semi-persistent resource and the fourth configuration information of the second semi-persistent resource to the terminal, the first time information may cause the terminal to transmit the data on the sidelink using the first semi-persistent resource, for example, the first time information may cause the terminal to transmit the data to another terminal on the sidelink using the first semi-persistent resource, and the fourth time information may cause the terminal to transmit the data to another terminal on the sidelink using the second semi-persistent resource, thereby implementing a semi-persistent resource configuration mechanism for the sidelink, and implementing the technical effect that the terminal transmits the data without depending on the DCI signaling.

As an optional implementation, in the act S404, the network side entity sends the third configuration information of the first semi-persistent resource and the fourth configuration information of the second semi-persistent resource to the terminal through the radio resource control (RRC) signaling, including: the network side entity sends the third configuration information and the fourth configuration information under a second radio access type (RAT) to the terminal through the RRC signaling under a first radio access type.

In this implementation, for the solution that the time information of the second semi-persistent resource for retransmission and the time information of the associated initial transmission resource are indicated through the RRC signaling within different semi-persistent resources, when it is implemented that the network side entity sends the third configuration information of the first semi-persistent resource and the fourth configuration information of the second semi-persistent resource to the terminal through the radio resource control (RRC) signaling, the network side entity may send the third configuration information and the fourth configuration information under the second radio access type (RAT) to the terminal through the RRC signaling under the first radio access type, so as to achieve the purpose of configuring the initial transmission resource and the retransmission resource in a cross-RAT scenario at the same time. Therefore, for a scenario of cross-RAT scheduling, that is, a scenario in which an LTE Uu interface schedules NR PC5, even if there is no DCI signaling, sidelink resource scheduling may also be performed.

As an optional implementation, the network side entity is in a vehicle-to-everything system.

In this implementation, for the solution that the time information of the second semi-persistent resource for retransmission and the time information of the associated initial transmission resource are indicated through the RRC signaling within different semi-persistent resources, the network side entity may be applied in the vehicle-to-everything system, so that a mechanism of sidelink channel semi-persistent resource configuration in the vehicle-to-everything system can be implemented by the above method, thereby further achieving the purpose of configuring the initial transmission resource and the retransmission resource in the cross-RAT scenario at the same time.

The method for resource configuration in accordance with an implementation of the present disclosure will be introduced below from the terminal side.

Figure 5:
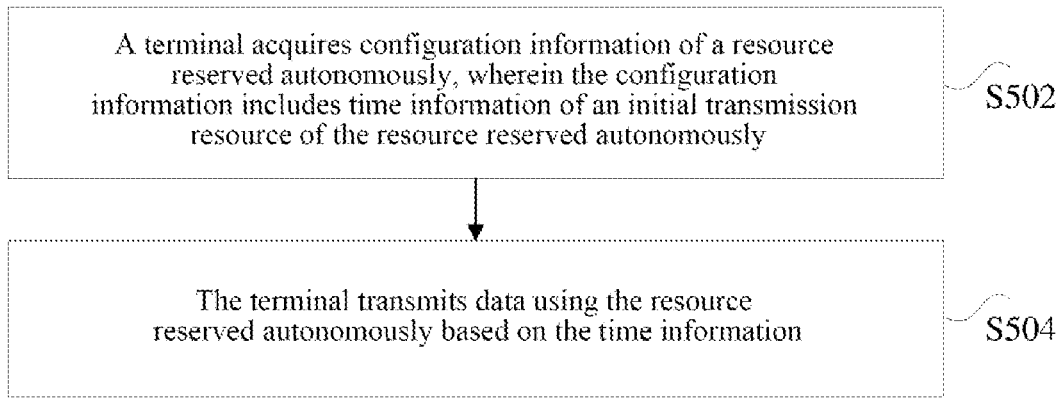
FIG. 5 is a flowchart of another method for resource configuration in accordance with an implementation of the present disclosure.

FIG. 5 is a flowchart of another method for resource configuration in accordance with an implementation of the present disclosure. As shown in FIG. 5, the method may include following acts S502 and S504.

In the act S502, a terminal acquires configuration information of a reserved resource, wherein the configuration information includes time information of an initial transmission resource of the reserved resource.

In the technical solution provided in the above act S502 of the present disclosure, a time indicated by time information of a resource used for retransmission of the Nth initial transmission resource in the reserved resource is earlier than a time indicated by time information of the (N+1)th initial transmission resource in the reserved resource, wherein N is a natural number greater than 0.

In this implementation, the terminal acquires the reserved resource, that is, a UE reserved resource. The process of implementing the UE reserved resource in this implementation may be a process in which the terminal monitors resources therein in a resource pool voluntarily to determine whether an abnormal resource is monitored from the resource pool, removes the abnormal resource from the resource pool if the abnormal resource is monitored in the resource pool, then selects another available resource in the resource pool, and notifies another surrounding terminal of the another available resource, wherein the abnormal resource may be a resource that conflicts with an available resource. The terminal acquires the configuration information of the reserved resource in this implementation, the configuration information may include the time information of the initial transmission resource of the reserved resource, and the time indicated by the time information of the resource used for retransmission of the Nth initial transmission resource is earlier than the time indicated by the time information of the (N+1)th initial transmission resource. Optionally, in this implementation, the time indicated by the time information of the resource used for retransmission of the Nth initial transmission resource may be denoted by A, and the time indicated by the first time information of the (N+1)th initial transmission resource may be denoted by B. A should be earlier than B, that is, the resource used for retransmission of the Nth initial transmission resource cannot be later than the (N+1)th initial transmission resource in time.

In act S504, the terminal transmits data using the reserved resource based on the time information.

In the technical solution provided in the act S504 of the present disclosure, after the terminal acquires the configuration information of the reserved resource, the terminal transmits the data using the reserved resource based on the time information. In this implementation, unlike a mode of receiving or sending communication data by a base station in the traditional cellular system, a terminal-to-terminal direct communication mode may be used in this implementation, and this may cause the terminal to transmit the data to another terminal using the reserved resource, implementing D2D communication with another terminal, and further achieving the purpose of having relatively high spectrum efficiency and relatively low transmission delay.

In the method for resource configuration at the terminal side in accordance with an implementation of the present disclosure, the terminal acquires the configuration information of the reserved resource, and transmits the data using the reserved resource based on the time information in the configuration information. And the time indicated by the time information of the resource used for retransmission of the Nth initial transmission resource in the reserved resource is earlier than the time indicated by the time information of the (N+1)th initial transmission resource in the reserved resource, thus the terminal may transmit the data normally based on the resource used for retransmission of the Nth initial transmission resource and the (N+1)th initial transmission resource in turn, to avoid a restriction on reservation of a retransmission resource caused by processing one semi-persistent resource using one HARQ process.

The above method of this implementation will be further introduced below.

As an optional implementation, it is implemented that the time indicated by the time information of the resource used for retransmission of the Nth initial transmission resource is earlier than the time indicated by the time information of the (N+1)th initial transmission resource by at least one of following modes: limiting the maximum time range of reservation of the resource used for retransmission of the Nth initial transmission resource; or limiting the maximum number of times of reservation of the resource used for retransmission of the Nth initial transmission resource.

Optionally, in this implementation, when the resource is a resource reserved by the terminal, reservation of the resource used for retransmission of the Nth initial transmission resource has a certain time range, the maximum time range of reservation of the resource used for retransmission of the Nth initial transmission resource may be limited in this implementation, and the upper limit time and the lower limit time of the maximum time range may be set, so that it is implemented that the time indicated by the time information of the resource used for retransmission of the Nth initial transmission resource is earlier than the time indicated by the time information of the (N+1)th initial transmission resource. Optionally, the retransmission resource in this implementation has a number of times of reservation, and in this implementation, the maximum number of times of reservation of the resource used for retransmission of the Nth initial transmission resource may also be limited, and the upper limit number of times and the lower limit number of times of the maximum number of times may be set, so that the time indicated by the time information of the resource used for retransmission of the Nth initial transmission resource is earlier than the time indicated by the time information of the (N+1)th initial transmission resource.

It should be noted that the terminal in accordance with this implementation may be a user equipment having a wireless communication function, such as a smart phone (for example, a mobile phone using an Android system, or a mobile phone using an IOS system), a tablet computer, a smart wearable device (for example, an augmented reality (AR) device, a virtual reality (VR) device or a smart watch), or the like, which is not limited herein.

Figure 6:
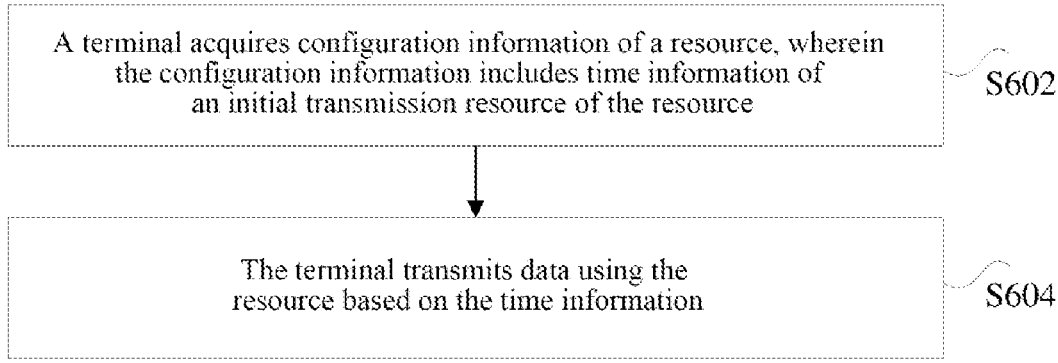
FIG. 6 is a flowchart of another method for resource configuration in accordance with an implementation of the present disclosure.

FIG. 6 is a flowchart of another method for resource configuration in accordance with an implementation of the present disclosure. As shown in FIG. 6, the method may include following acts S602 and S604.

In the act S602, a terminal acquires configuration information of a resource, wherein the configuration information includes time information of an initial transmission resource of the resource.

In the technical solution provided in the above act S602 of the present disclosure, the terminal may acquire the configuration information of the resource, the resource in this implementation is not limited to a semi-persistent resource configured by a network side entity or a resource reserved by the terminal. A time indicated by time information of a resource used for retransmission of the Nth initial transmission resource is earlier than a time indicated by time information of the (N+1)th initial transmission resource, wherein N is a natural number greater than 0.

In the act S604, the terminal transmits data using the resource based on the time information.

In the technical solution provided in the act S604 of the present disclosure, after the terminal acquires the configuration information of the resource, the terminal transmits the data using the resource based on the time information. In this implementation, unlike a mode of receiving or sending communication data by a base station in the traditional cellular system, a terminal-to-terminal direct communication mode may be used in this implementation, and this may cause the terminal to transmit the data to another terminal using the above resource, implementing D2D communication with another terminal, and further achieving the purpose of having relatively high spectrum efficiency and relatively low transmission delay.

It should be noted that, since the resource in this implementation is not limited to the semi-persistent resource configured by the network side entity or the resource reserved by the terminal, not only D2D communication in Mode A, but also D2D communication in Mode B may be implemented in this implementation. For example, in the Mode A, a transmission resource of the terminal is allocated by a base station, the terminal sends the data on a sidelink according to a resource allocated by the base station, and the base station may allocate the resource transmitted once to the terminal, or allocate the resource transmitted semi-persistentally to the terminal; and in the Mode B, a vehicle-mounted terminal selects one resource from a resource pool for transmission of the data.

In the method for resource configuration at the terminal side in accordance with an implementation of the present disclosure, the terminal acquires the configuration information of the resource, and transmits the data using the resource based on the time information in the configuration information, and the time indicated by the time information of the resource used for retransmission of the Nth initial transmission resource is earlier than the time indicated by the time information of the (N+1)th initial transmission resource, thus the terminal may transmit the data normally based on the resource used for retransmission of the Nth initial transmission resource and the (N+1)th initial transmission resource in turn, to avoid a restriction on reservation of a retransmission resource caused by processing one semi-persistent resource using one HARQ process.

The above method of this implementation will be further introduced below.

As an optional implementation, it is implemented that the time indicated by the time information of the resource used for retransmission of the Nth initial transmission resource is earlier than the time indicated by the time information of the (N+1)th initial transmission resource by at least one of following modes: limiting the maximum time range of reservation of the resource used for retransmission of the Nth initial transmission resource; or limiting the maximum number of times of reservation of the resource used for retransmission of the Nth initial transmission resource.

Optionally, in this implementation, the retransmission resource cannot be later than the (N+1)th initial transmission resource in time, which may be implemented by at least one of modes: limiting the maximum time range of reservation of the resource used for retransmission of the Nth initial transmission resource; or limiting the maximum number of times of reservation of the resource used for retransmission of the Nth initial transmission resource. In this implementation, reservation of the resource used for retransmission of the Nth initial transmission resource has a certain time range, and in this implementation, the maximum time range of reservation of the resource used for retransmission of the Nth initial transmission resource may be limited, and the upper limit time and the lower limit time of the maximum time range may be set, so that it is implemented that the time indicated by the time information of the resource used for retransmission of the Nth initial transmission resource is earlier than the time indicated by the time information of the (N+1)th initial transmission resource. Optionally, the retransmission resource in this implementation has a number of times of reservation, and in this implementation, the maximum number of times of reservation of the resource used for retransmission of the Nth initial transmission resource may also be limited, and the upper limit number of times and the lower limit number of times of the maximum number of times may be set, so that the time indicated by the time information of the resource used for retransmission of the Nth initial transmission resource is earlier than the time indicated by the time information of the (N+1)th initial transmission resource.

An implementation of the present disclosure further provides another method for resource configuration from the terminal side, which corresponds to the method for resource configuration at the network side shown in FIG. 1.

Figure 7:
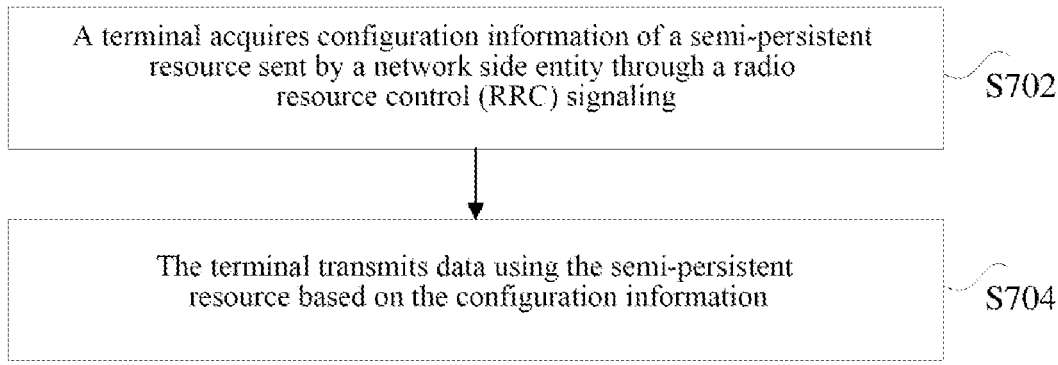
FIG. 7 is a flowchart of another method for resource configuration in accordance with an implementation of the present disclosure.

FIG. 7 is a flowchart of another method for resource configuration in accordance with an implementation of the present disclosure. As shown in FIG. 7, the method may include following acts S702 and S704.

In the act S702, a terminal acquires configuration information of a semi-persistent resource sent by a network side entity through a radio resource control (RRC) signaling.

In the technical solution provided by the above act S702 of the present disclosure, the configuration information is used for indicating at least one piece of following information: time information of a retransmission resource, time offset position information of the retransmission resource relative to an initial transmission resource, time information of the initial transmission resource, or time information of an initial transmission resource associated with the retransmission resource.

In the act S704, the terminal transmits data using the semi-persistent resource based on the configuration information.

In the technical solution provided by the above act S704 of the present disclosure, after the terminal acquires the configuration information of the semi-persistent resource sent by the network side entity through the radio resource control (RRC) signaling, the terminal acquires the configuration information of the semi-persistent resource sent by the network side entity through the radio resource control (RRC) signaling, and may transmit the data using the semi-persistent resource based on the configuration information. In this implementation, unlike a mode of receiving or sending communication data by a base station in the traditional cellular system, a terminal-to-terminal direct communication mode may be used in this implementation, and this may cause the terminal to transmit the data to another terminal using the semi-persistent resource based on the configuration information, implementing D2D communication with another terminal, and further achieving the purpose of having relatively high spectrum efficiency and relatively low transmission delay.

In the method for resource configuration at the terminal side in accordance with an implementation of the present disclosure, the data is transmitted using using the semi-persistent resource based on the configuration information, thus in a case that a DCI signaling exists, the DCI signaling may be used for implementing an operation other than resource configuration, while it is not limited to be that the resource configuration is implemented only through the DCI signaling. Even in a scenario in which no DCI signaling can be used or using of the DCI signaling is not supported, the resource configuration may also be implemented through the RRC signaling, thereby solving the technical problem that resource configuration is difficult to perform without the DCI signaling, and achieving the technical effect that the resource configuration may also implemented without the DCI signaling.

An implementation of the present disclosure further provides another method for resource configuration from the terminal side, which corresponds to the method for resource configuration at the network side shown in FIG. 2.

As an optional implementation, in the act S702, the terminal acquires the configuration information of the semi-persistent resource sent by the network side entity through the radio resource control (RRC) signaling, including: the terminal acquires first configuration information of a first semi-persistent resource sent by the network side entity through the RRC signaling, wherein the first configuration information includes first time information of the initial transmission resource and/or second time information of the retransmission resource; in the act S704, the terminal transmits the data using the semi-persistent resource based on the configuration information, including: the terminal transmits the data using the first semi-persistent resource based on the first time information and/or the second time information.

Figure 8:
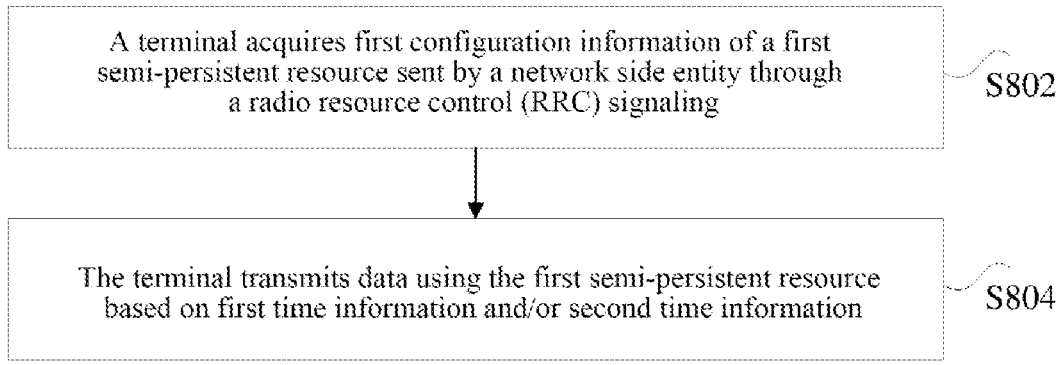
FIG. 8 is a flowchart of another method for resource configuration in accordance with an implementation of the present disclosure.

FIG. 8 is a flowchart of another method for resource configuration in accordance with an implementation of the present disclosure. As shown in FIG. 8, the method may include following acts S802 and S804.

In the act S802, a terminal acquires first configuration information of a first semi-persistent resource sent by a network side entity through a radio resource control (RRC) signaling.

In the technical solution provided by the above act S802 of the present disclosure, the first configuration information includes first time information of an initial transmission resource and/or second time information of a retransmission resource.

In this implementation, the terminal acquires the first configuration information of the first semi-persistent resource sent by the network side entity through the RRC signaling. The first configuration information includes the first time information of the initial transmission resource, and the first time information includes transmission time of the initial transmission resource, and may indicate a position of the transmission time of the initial transmission resource on the time axis, wherein the initial transmission resource is a semi-persistent resource used for initial transmission in the first semi-persistent resource. Optionally, the first configuration information in this implementation may also include the second time information for the retransmission resource, and the second time information includes transmission time of the retransmission resource, and may indicate a position of the transmission time of the retransmission resource on the time axis, wherein the retransmission resource is a semi-persistent resource used for retransmission in the first semi-persistent resource, and exists based on the initial transmission resource, so that it is implemented that the terminal acquires the second time information of the retransmission resource indicated through the RRC signaling within the same first semi-persistent resource configuration.

In the act S804, the terminal transmits data using the first semi-persistent resource based on the first time information and/or the second time information.

In the technical solution provided by the above act S804 of the present disclosure, after the terminal acquires the first configuration information of the first semi-persistent resource sent by the network side entity through the radio resource control (RRC) signaling, the terminal transmits the data using the first semi-persistent resource based on the first time information and/or the second time information.

In this implementation, unlike a mode of receiving or sending communication data by a base station in the traditional cellular system, a terminal-to-terminal direct communication mode may be used in this implementation, and the terminal transmits the data to another terminal using the first semi-persistent resource, thereby implementing D2D communication with another terminal, and further achieving the purpose of having relatively high spectrum efficiency and relatively low transmission delay.

The above method of this implementation will be further introduced below.

As an optional implementation, a time indicated by time information of a resource used for retransmission of the Nth initial transmission resource is earlier than a time indicated by first time information of the (N+1)th initial transmission resource, wherein N is a natural number greater than 0.

In this implementation, for the solution that the terminal acquires time information of the retransmission resource indicated through the RRC signaling within the same first semi-persistent resource configuration, there may be multiple initial transmission resources in the first semi-persistent resource, and the time indicated by the time information of the resource used for retransmission of the Nth initial transmission resource is earlier than the time indicated by the first time information of the (N+1)th initial transmission resource, that is, the resource used for retransmission of the Nth initial transmission resource cannot be later than the (N+1)th initial transmission resource in time, thus the terminal may transmit the data normally based on the resource used for retransmission of the Nth initial transmission resource and the (N+1)th initial transmission resource in turn, to avoid a restriction on reservation of the retransmission resource caused by processing one semi-persistent resource using one HARQ process.

As an optional implementation, the method further includes: it is implemented that the time indicated by the time information of the resource used for retransmission of the Nth initial transmission resource is earlier than the time indicated by the time information of the (N+1)th initial transmission resource by at least one of following modes: limiting the maximum time range of reservation of the resource used for retransmission of the Nth initial transmission resource; or limiting the maximum number of times of reservation of the resource used for retransmission of the Nth initial transmission resource.

In this implementation, for the solution that the terminal acquires the time information of the retransmission resource indicated through the RRC signaling within the same first semi-persistent resource configuration, reservation of the resource used for retransmission of the Nth initial transmission resource has a certain time range, and the maximum time range of reservation of the resource used for retransmission of the Nth initial transmission resource may be limited in this implementation, so that the time indicated by the time information of the resource used for retransmission of the Nth initial transmission resource is earlier than the time indicated by the time information of the (N+1)th initial transmission resource. Optionally, the retransmission resource has a number of times of reservation in this implementation, and the maximum number of times of reservation of the resource used for retransmission of the Nth initial transmission resource may also be limited in this implementation, so that the time indicated by the time information of the resource used for retransmission of the Nth initial transmission resource is earlier than the time indicated by the time information of the (N+1)th initial transmission resource.

As an optional implementation, the terminal transmits the data on a sidelink using the first semi-persistent resource based on the first time information and/or the second time information.

In this implementation, the terminal may send the data on the sidelink according to a resource allocated by the base station to implement D2D communication. In this implementation, for the solution that the terminal acquires the time information of the retransmission resource indicated through the RRC signaling within the same first semi-persistent resource configuration, after the terminal acquires the first configuration information sent by the network side entity, the terminal may transmit the data on the sidelink using the first semi-persistent resource based on the first time information and/or the second time information, for example, the terminal may transmit the data to another terminal on the sidelink using the first semi-persistent resource based on the first time information and/or the second time information, thereby implementing a semi-persistent resource configuration mechanism for the sidelink, and implementing the technical effect that the terminal transmits the data without depending on a DCI signaling.

As an optional implementation, in the act S802, the terminal acquires the first configuration information of the first semi-persistent resource sent by the network side entity through the radio resource control (RRC) signaling, including: the terminal acquires the first configuration information under a second radio access type (RAT) sent by the network side entity through the RRC signaling under a first radio access type.

In this implementation, when it is implemented that the terminal acquires the first configuration information of the first semi-persistent resource sent by the network side entity through the radio resource control (RRC) signaling, the terminal may acquire the first configuration information under the second radio access type (RAT) sent by the network side entity through the RRC signaling under the first radio access type, so as to achieve the purpose of configuring the initial transmission resource and the retransmission resource in a cross-RAT scenario at the same time. Therefore, for a scenario of cross-RAT scheduling, that is, a scenario in which an LTE Uu interface schedules NR PC5, even if there is no DCI signaling, sidelink resource scheduling may also be performed.

As an optional implementation, the terminal is in a vehicle-to-everything system.

In this implementation, for the solution that the terminal acquires the time information of the retransmission resource indicated through the RRC signaling within the same first semi-persistent resource configuration, the terminal may be applied in the vehicle-to-everything system, so that a mechanism of sidelink channel semi-persistent resource configuration in the vehicle-to-everything system may be implemented by the above method, thereby further achieving the purpose of configuring the initial transmission resource and the retransmission resource in the cross-RAT scenario at the same time.

An implementation of the present disclosure further provides another method for resource configuration from the terminal side, which corresponds to the method for resource configuration at the network side shown in FIG. 3.

As an optional implementation, in the act S702, the terminal acquires the configuration information of the semi-persistent resource sent by the network side entity through the radio resource control (RRC) signaling, including: the terminal acquires second configuration information of a first semi-persistent resource sent by the network side entity through the RRC signaling, wherein the second configuration information includes first time information of the initial transmission resource and third time information of the retransmission resource; in the act S704, the terminal transmits the data using the semi-persistent resource based on the configuration information, including: the terminal transmits the data using the first semi-persistent resource based on the second configuration information.

Figure 9:
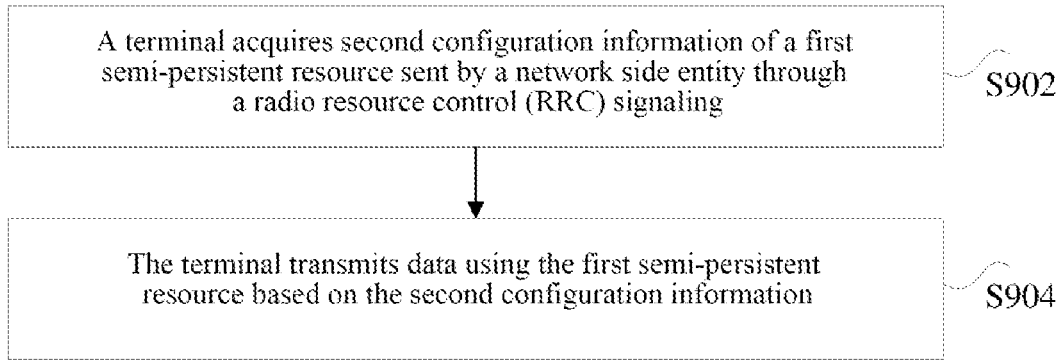
FIG. 9 is a flowchart of another method for resource configuration in accordance with an implementation of the present disclosure.

FIG. 9 is a flowchart of another method for resource configuration in accordance with an implementation of the present disclosure. As shown in FIG. 9, the method may include following acts S902 and S904.

In the act S902, a terminal acquires second configuration information of a first semi-persistent resource sent by a network side entity through a radio resource control (RRC) signaling.

In the technical solution provided by the above act S902 of the present disclosure, the second configuration information includes first time information of an initial transmission resource and third time information of a retransmission resource.

In this implementation, the terminal acquires the second configuration information for the first semi-persistent resource sent by the network side entity through the RRC signaling, wherein the second configuration information includes the first time information of the initial transmission resource used for initial transmission, and the first time information includes transmission time of the initial transmission resource and may include a position of the transmission time of the initial transmission resource on the time axis. Optionally, the second configuration information in this implementation may also include the third time information of the retransmission resource used for retransmission, the third time information includes transmission time of the retransmission resource, and may indicate a position of the transmission time of the retransmission resource on the time axis, and may also include time offset position information of the retransmission resource, wherein the retransmission resource in this implementation may be a retransmission resource of the initial transmission resource.

In the act S904, the terminal transmits data using the first semi-persistent resource based on the second configuration information.

In the technical solution provided by the above act S904 of the present disclosure, after the terminal acquires the second configuration information of the first semi-persistent resource sent by the network side entity through the radio resource control (RRC) signaling, the terminal transmits the data using the first semi-persistent resource based on the second configuration information, and this may cause the terminal to transmit the data to another terminal using the first semi-persistent resource, thereby implementing D2D communication with another terminal, and further achieving the purpose of having relatively high spectrum efficiency and relatively low transmission delay.

The above method of this implementation will be further introduced below.

As an optional implementation, the third time information of the retransmission resource includes first time offset position information of the retransmission resource relative to the initial transmission resource.

In this implementation, the third time information of the retransmission resource in the second configuration information acquired by the terminal includes the first time offset position information of the retransmission resource relative to the initial transmission resource, wherein the first time offset position information may be used for indicating an offset of time corresponding to the retransmission resource relative to time corresponding to the initial transmission resource, so that it is implemented that the offset of the time of the retransmission resource relative to the time of the initial transmission resource is indicated through the RRC signaling within the same first semi-persistent resource configuration.

As an optional implementation, the method further includes: the terminal determines second time information of the retransmission resource based on the first time information and the first time offset position information, wherein the third time information further includes the second time information. The terminal transmits the data using the first semi-persistent resource based on the second configuration information, including: the terminal transmits the data using the first semi-persistent resource based on the first time information and/or the second time information.

In this implementation, the third time information of the retransmission resource acquired by the terminal includes not only the first time offset position information of the retransmission resource relative to the initial transmission resource, but also the second time information of the retransmission resource, wherein the second time information includes retransmission time of the retransmission resource, and may indicate the position of the transmission time of the retransmission resource on the time axis. The terminal may transmit the data using the first semi-persistent resource based on the first time information and/or the second time information.

As an optional implementation, the terminal transmits the data on a sidelink using the first semi-persistent resource based on the first time information and/or the second time information.

In this implementation, for the solution that the terminal acquires a time offset of the retransmission resource relative to the initial transmission resource indicated through the RRC signaling within the same first semi-persistent resource configuration, after the terminal acquires the second configuration information sent by the network side entity, the terminal transmits the data on the sidelink using the first semi-persistent resource based on the first time information and/or the second time information, for example, the terminal transmits the data to another terminal on the sidelink using the first semi-persistent resource based on the first time information and/or the second time information, thereby implementing a semi-persistent resource configuration mechanism for the sidelink, and implementing the technical effect that the terminal transmits the data without depending on a DCI signaling.

As an optional implementation, a time indicated by time information of a resource for retransmission of the Nth initial transmission resource is earlier than a time indicated by first time information of the (N+1)th initial transmission resource, wherein N is a natural number greater than 0.

In this implementation, for the solution that the terminal acquires the time offset of the retransmission resource relative to the initial transmission resource indicated through the RRC signaling within the same semi-persistent resource configuration, there may be multiple initial transmission resources in the first semi-persistent resource, and the time indicated by the time information of the resource used for retransmission of the Nth initial transmission resource is earlier than the time indicated by the first time information of the (N+1)th initial transmission resource, that is, the resource used for retransmission of the Nth initial transmission resource cannot be later than the (N+1)th initial transmission resource in time, thus the terminal may transmit the data normally based on the resource used for retransmission of the Nth initial transmission resource and the (N+1)th initial transmission resource in turn, to avoid a restriction on reservation of the retransmission resource caused by processing one semi-persistent resource using one HARQ process.

As an optional implementation, the method further includes: it is implemented that the time indicated by the time information of the resource used for retransmission of the Nth initial transmission resource is earlier than the time indicated by the time information of the (N+1)th initial transmission resource by at least one of following modes: limiting the maximum time range of reservation of the resource used for retransmission of the Nth initial transmission resource; or limiting the maximum number of times of reservation of the resource used for retransmission of the Nth initial transmission resource.

In this implementation, for the solution that the terminal acquires the time offset of the retransmission resource relative to the initial transmission resource indicated through the RRC signaling within the same semi-persistent resource configuration, reservation of the resource used for retransmission of the Nth initial transmission resource has a certain time range, and the maximum time range of reservation of the resource used for retransmission of the Nth initial transmission resource may be limited, so that it is implemented that the time indicated by the time information of the resource used for retransmission of the Nth initial transmission resource is earlier than the time indicated by the time information of the (N+1)th initial transmission resource. Optionally, the retransmission resource has a number of times of reservation, and the maximum number of times of reservation of the resource used for retransmission of the Nth initial transmission resource may also be limited in this implementation, so that the time indicated by the time information of the resource used for retransmission of the Nth initial transmission resource is earlier than the time indicated by the time information of the (N+1)th initial transmission resource.

As an optional implementation, in the act S902, the terminal acquires the second configuration information of the first semi-persistent resource sent by the network side entity through the radio resource control (RRC) signaling, including: the terminal acquires the second configuration information under a second radio access type (RAT) sent by the network side entity through the RRC signaling under a first radio access type.

In this implementation, for the solution that the terminal acquires the time offset of the retransmission resource relative to the initial transmission resource indicated through the RRC signaling within the same semi-persistent resource configuration, when it is implemented that the terminal acquires the second configuration information of the first semi-persistent resource sent by the network side entity through the radio resource control (RRC) signaling, the terminal may acquire the second configuration information under the second radio access type sent by the network side entity through the RRC signaling under the first radio access type, so as to achieve the purpose of configuring the initial transmission resource and the retransmission resource in a cross-RAT scenario at the same time. Therefore, for a scenario of cross-RAT scheduling, that is, a scenario in which an LTE Uu interface schedules NR PC5, even if there is no DCI signaling, sidelink resource scheduling may also be performed.

As an optional implementation, the terminal is in a vehicle-to-everything system.

In this implementation, for the solution that the terminal acquires the time offset of the retransmission resource relative to the initial transmission resource indicated through the RRC signaling within the same semi-persistent resource configuration, the terminal may be applied in the vehicle-to-everything system, so that a mechanism of sidelink channel semi-persistent resource configuration in the vehicle-to-everything system may be implemented by the above method, thereby further achieving the purpose of configuring the initial transmission resource and the retransmission resource in the cross-RAT scenario at the same time.

An implementation of the present disclosure further provides another method for resource configuration from the terminal side, which corresponds to the method for resource configuration at the network side shown in FIG. 4.

As an optional implementation, in the act S702, the terminal acquires the configuration information of the semi-persistent resource sent by the network side entity through the radio resource control (RRC) signaling, including: the terminal acquires third configuration information of a first semi-persistent resource and fourth configuration information of a second semi-persistent resource sent by the network side entity through the RRC signaling, wherein the third configuration information includes first time information of the first semi-persistent resource used for initial transmission, the fourth configuration information includes fourth time information of the second semi-persistent resource used for retransmission, and the first semi-persistent resource is associated with the second semi-persistent resource; in the act S704, the terminal transmits the data using the semi-persistent resource based on the configuration information, including: the terminal transmits the data using the first semi-persistent resource based on the first time information, and transmits the data using the second semi-persistent resource based on the fourth time information.

Figure 10:
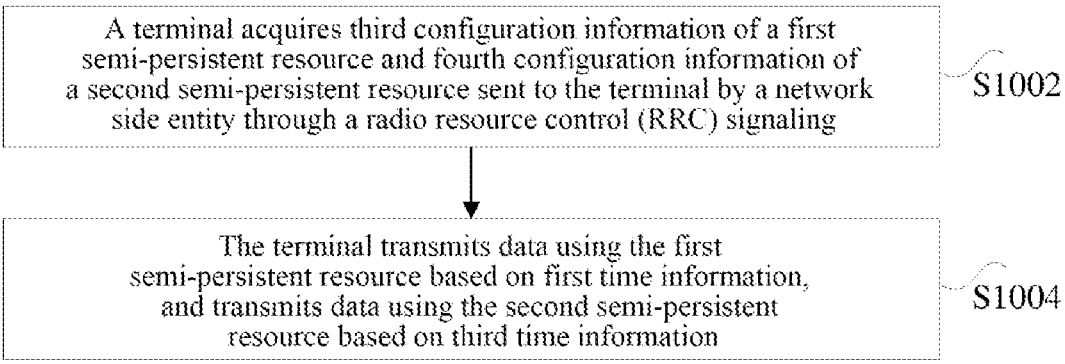
FIG. 10 is a flowchart of another method for resource configuration in accordance with an implementation of the present disclosure.

FIG. 10 is a flowchart of another method for resource configuration in accordance with an implementation of the present disclosure. As shown in FIG. 10, the method may include following acts S1002 and S1004.

In the act S1002, a terminal acquires third configuration information of a first semi-persistent resource and fourth configuration information of a second semi-persistent resource sent to the terminal by a network side entity through a radio resource control (RRC) signaling.

In the technical solution provided by the above act S1002 of the present disclosure, the third configuration information includes first time information of the first semi-persistent resource used for initial transmission, the fourth configuration information includes fourth time information of the second semi-persistent resource used for retransmission, and the first semi-persistent resource is associated with the second semi-persistent resources.

In this implementation, the terminal acquires the third configuration information of the first semi-persistent resource and the fourth configuration information of the second semi-persistent resource sent by the network side entity through the RRC signaling, wherein the third configuration information includes first time information for an initial transmission resource, and the first time information includes transmission time of the initial transmission resource, and may indicate a position of the transmission time of the initial transmission resource on the time axis, wherein the initial transmission resource is a semi-persistent resource used for initial transmission in the first semi-persistent resource. Optionally, the fourth configuration information in this implementation may include the fourth time information of the second semi-persistent resource for retransmission, the first semi-persistent resource is associated with the second semi-persistent resource, and the second time information includes transmission time of the second semi-persistent resource, and may include a position of the transmission time of the second semi-persistent resource on the time axis, such that it is implemented that the terminal acquires time information of the second semi-persistent resource for retransmission indicated through the RRC signaling within different semi-persistent resources.

In the act S1004, the terminal transmits data using the first semi-persistent resource based on the first time information, and transmits data using the second semi-persistent resource based on the fourth time information.

In the technical solution provided by the above act S1004 of the present disclosure, after the terminal acquires the third configuration information of the first semi-persistent resource and the fourth configuration information of the second semi-persistent resource sent to the terminal by the network side entity through the radio resource control (RRC) signaling, the terminal transmits the data using the first semi-persistent resource based on the first time information, and transmits the data using the second semi-persistent resource based on the fourth time information.

In this implementation, unlike a mode receiving or sending communication data by a base station in the traditional cellular system, a terminal-to-terminal direct communication mode may be used in this implementation, so that the terminal may transmit the data to another terminal using the first semi-persistent resource, or transmit the data to another terminal using the second semi-persistent resource, thereby implementing D2D communication with another terminal, and further achieving the purpose of having relatively high spectrum efficiency and relatively low transmission delay.

The above method of this implementation will be further introduced below.

As an optional implementation, the method further includes: the terminal acquires association information of the first semi-persistent resource and the second semi-persistent resource sent by the network side entity, wherein the association information is used for indicating that the first semi-persistent resource is used for initial transmission and the second semi-persistent resource is used for retransmission.

In this implementation, there is a certain association relationship between the first semi-persistent resource and the second semi-persistent resource. In addition to acquiring the first configuration information of the first semi-persistent resource and the second configuration information of the second semi-persistent resource sent by the network side entity, the terminal may also acquire the association information about the first semi-persistent resource and the second semi-persistent resource sent by the network side entity, and the terminal determines, based on the association information, that the first semi-persistent resource is used for initial transmission and the second semi-persistent resource is used for retransmission.

As an optional implementation, a time indicated by time information of a resource used for retransmission of the Nth initial transmission resource is earlier than a time indicated by first time information of the (N+1)th initial transmission resource, wherein N is a natural number greater than 0.

In this implementation, for the solution that the terminal acquires the time information of the second semi-persistent resource for retransmission and time information of an associated initial transmission resource indicated through the RRC signaling within different semi-persistent resources, there may be multiple initial transmission resources in the first semi-persistent resource, and the time indicated by the time information of the resource used for retransmission of the Nth initial transmission resource in the first semi-persistent resource is earlier than the time indicated by the first time information of the (N+1)th initial transmission resource, that is, the resource used for retransmission of the Nth initial transmission resource cannot be later than the (N+1)th initial transmission resource in time, thus the terminal may transmit the data normally based on the resource used for retransmission of the Nth initial transmission resource and the (N+1)th initial transmission resource in turn, to avoid a restriction on reservation of a retransmission resource caused by processing one semi-persistent resource using one HARQ process.

As an optional implementation, the method further includes: it is implemented that the time indicated by the time information of the resource used for retransmission of the Nth initial transmission resource is earlier than the time indicated by the time information of the (N+1)th initial transmission resource by at least one of following modes: limiting the maximum time range of reservation of the resource used for retransmission of the Nth initial transmission resource; or limiting the maximum number of times of reservation of the resource used for retransmission of the Nth initial transmission resource.

In this implementation, for the solution that the terminal acquires the time information of the second semi-persistent resource for retransmission and the time information of the associated initial transmission resource indicated through the RRC signaling within different semi-persistent resources, reservation of the resource used for retransmission of the Nth initial transmission resource has a certain time range, and the maximum time range of reservation of the resource used for retransmission of the Nth initial transmission resource may be limited, so that it is implemented that the time indicated by the time information of the resource used for retransmission of the Nth initial transmission resource is earlier than the time indicated by the time information of the (N+1)th initial transmission resource. Optionally, the retransmission resource have a number of times of reservation, and the maximum number of times of reservation of the resource used for retransmission of the Nth initial transmission resource may also be limited in this implementation, so that the time indicated by the time information of the resource used for retransmission of the Nth initial transmission resource is earlier than the time indicated by the time information of the (N+1)th initial transmission resource.

As an optional implementation, the terminal transmits the data on a sidelink using the first semi-persistent resource based on the first time information, and transmits the data on the sidelink using the second semi-persistent resource based on the fourth time information.

In this implementation, for the solution that the terminal acquires the time information of the second semi-persistent resource for retransmission and the time information of the associated initial transmission resource indicated through the RRC signaling within different semi-persistent resources, after the terminal acquires the third configuration information of the first semi-persistent resource and the fourth configuration information of the second semi-persistent resource sent by the network side entity, the terminal transmits the data on the sidelink using the first semi-persistent resource based on the first time information, for example, the terminal transmits the data to another terminal on the sidelink using the first semi-persistent resource based on the first time information; and the terminal may also transmits the data on the sidelink using the second semi-persistent resource based on the fourth time information, for example, the terminal transmits the data to another terminal on the sidelink using the second semi-persistent resource based on the fourth time information, thereby implementing a semi-persistent resource configuration mechanism for the sidelink, and implementing the technical effect that the terminal transmits the data without depending on a DCI signaling.

As an optional implementation, in the act S1002, the terminal acquires the third configuration information of the first semi-persistent resource and the fourth configuration information of the second semi-persistent resource sent to the terminal by the network side entity through the radio resource control (RRC) signaling, including: the terminal acquires the fourth configuration information under a second radio access type (RAT) sent by the network side entity through the RRC signaling under a first radio access type.

In this implementation, for the solution that the terminal acquires the time information of the second semi-persistent resource for retransmission and the time information of the associated initial transmission resource indicated through the RRC signaling within different semi-persistent resources, when it is implemented that the terminal acquires the third configuration information of the first semi-persistent resource and the fourth configuration information of the second semi-persistent resource sent to the terminal by the network side entity through the radio resource control (RRC) signaling, the terminal may acquire the fourth configuration information under the second radio access type (RAT) sent by the network side entity through the RRC signaling under the first radio access type, so as to achieve the purpose of configuring the initial transmission resource and the retransmission resource in a cross-RAT scenario at the same time. Therefore, for a scenario of cross-RAT scheduling, that is, a scenario in which an LTE Uu interface schedules NR PC5, even if there is no DCI signaling, sidelink resource scheduling may also be performed.

As an optional implementation, the terminal is in a vehicle-to-everything system.

In this implementation, for the solution that the terminal acquires the time information of the second semi-persistent resource for retransmission and the time information of the associated initial transmission resource indicated through the RRC signaling within different semi-persistent resources, the terminal may be applied in the vehicle-to-everything system, so that a mechanism of sidelink channel semi-persistent resource configuration in the vehicle-to-everything system may be implemented by the above method, thereby further achieving the purpose of configuring the initial transmission resource and the retransmission resource in the cross-RAT scenario at the same time.

In the related technologies, generally, the configuration information of the semi-persistent resource needs to be sent to the terminal with the help of the DCI signaling, but in a case that no DCI signaling can be used, or it is not supported that the DCI signaling may be used in the above method, resource configuration cannot be implemented. In addition, for processing one semi-persistent resource by using one HARQ process, it will also bring a restriction on reservation of the retransmission resource. In the method for resource configuration in accordance with this implementation, the configuration information of the semi-persistent resource is sent through the RRC signaling, so that the terminal may transmit the data using the semi-persistent resource based on the configuration information. Thus, in a case that the DCI signaling exists, the DCI signaling may be used for implementing an operation other than resource configuration, while it is not limited to be that the resource configuration is implemented only through the DCI signaling. Even in a scenario in which no DCI signaling can be used or using of the DCI signaling is not supported, the resource configuration may also be implemented through the RRC signaling, thereby solving the technical problem that the resource configuration is difficult to perform without the DCI signaling, and achieving the technical effect that the resource configuration may also be implemented without the DCI signaling. Further, in the present disclosure, by setting the time indicated by the time information of the resource used for retransmission of the Nth initial transmission resource to be earlier than the time indicated by the time information of the (N+1)th initial transmission resource, the terminal may transmit the data normally based on the resource used for retransmission of the Nth initial transmission resource and the (N+1)th initial transmission resource in turn, to avoid a restriction on reservation of the retransmission resource caused by processing one semi-persistent resource using one HARQ process.

The technical solutions in the above implementations of the present disclosure will be further illustrated below in conjunction with the preferred implementations.

Device to device communication is a sidelink transmission technology based on D2D. Unlike the mode of receiving or sending communication data by the base station in the traditional cellular system, the vehicle-to-everything system uses the terminal-to-terminal direct communication mode, and thus has relatively high spectrum efficiency and relatively low transmission delay. Two transmission modes, Mode A and Mode B, are defined in the 3rd Generation Partnership Project (3GPP).

Figure 11:
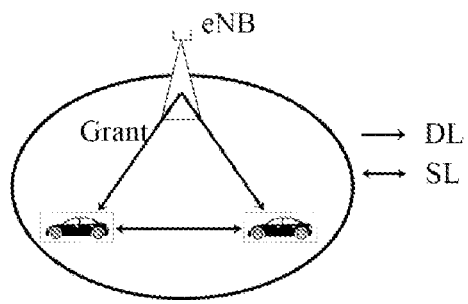
FIG. 11 is a schematic diagram of D2D communication in Mode A in accordance with an implementation of the present disclosure.

FIG. 11 is a schematic diagram of D2D communication in Mode A in accordance with an implementation of the present disclosure. As shown in FIG. 11, in the Mode A, a transmission resource of a terminal is allocated by a base station (eNB), the base station allocates a resource to the terminal through a downlink (DL) based on an authorizing signaling (Grant), and the terminal transmits data on a sidelink according to the allocated resource. The base station may allocate the resource transmitted once to the terminal, or allocate the resource transmitted semi-persistentally to the terminal.

Figure 12:
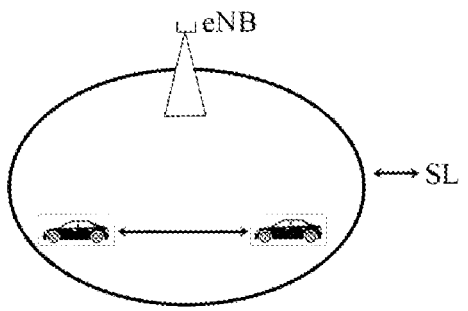
FIG. 12 is a schematic diagram of D2D communication in Mode B in accordance with an implementation of the present disclosure.

FIG. 12 is a schematic diagram of D2D communication in Mode B in accordance with an implementation of the present disclosure. As shown in FIG. 12, in the Mode B, a vehicle-mounted terminal may select one resource from a resource pool for transmission of data on a sidelink.

In the 3GPP, different stages are divided for studying D2D.

Proximity based service (ProSe): which is device-to-device communication in Rel-12/13, is studied for a scenario of ProSe, and is mainly for public security-type services.

Vehicle-to-everything (V2X): the vehicle-to-everything system is studied for a scenario of vehicle-to-vehicle communication in Rel-14/15, and mainly faces services of relatively high-speed moving vehicle-to-vehicle and vehicle-to-person communication.

Wearable device (FeD2D): in this scenario, a scenario in which a wearable device accesses a network through a mobile phone is studied in Rel-14, and this scenario mainly faces scenarios of a low moving speed and low power access.

In semi-persistent resource configuration, for the sidelink, configuration for a semi-persistent resource may be implemented in the LTE system by following modes: configuring information such as a time interval of the semi-persistent resource, etc., in the RRC signaling; or configuring information such as a time offset of initial transmission and retransmission of the semi-persistent resource, etc., in the DCI signaling. The terminal may calculate a time position of initial transmission and retransmission of the semi-persistent resource based on the above information.

In an NR system, configuration (type-1) for the semi-persistent resource may be implemented by following modes: configuring information such as a time interval or a time offset of the semi-persistent resource in the RRC signaling; or scheduling dynamically resource information for retransmission of the semi-persistent resource in the DCI signaling. The terminal may calculate time positions of initial transmission and retransmission of the semi-persistent resource based on the above information.

However, for the scenario of cross-RAT scheduling, that is, the scenario in which an LTE Uu interface schedules NR PC5, the DCI signaling is not supported for sidelink resource scheduling, so the above two modes of configuring the initial transmission and the retransmission of the semi-persistent resource are not applicable.

In addition, in order to process one semi-persistent resource using one HARQ process, this also brings a restriction on reservation of the retransmission resource.

An implementation can solve the problem of how to configure the initial transmission resource and the retransmission resource of the semi-persistent resource in the cross-RAT system in a scenario that no DCI can be used.

Figure 13:
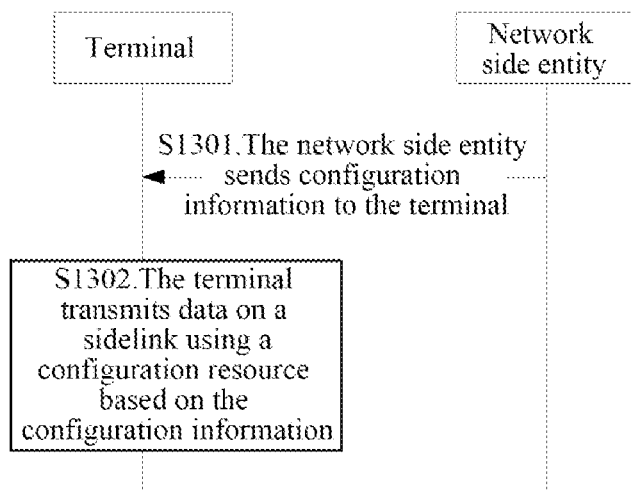
FIG. 13 is an interactive schematic diagram of resource configuration in accordance with an implementation of the present disclosure.

FIG. 13 is an interactive schematic diagram of resource configuration in accordance with an implementation of the present disclosure. As shown in FIG. 13, the method may include following acts S1301 and S1302.

In the act S1301, a network side entity sends configuration information to a terminal.

The configuration information may include time information of an initial transmission resource and/or time information of a retransmission resource of a configuration resource.

In the act S1302, the terminal transmits data on a sidelink using the configuration resource based on the configuration information.

As an optional example, the time information of the retransmission resource is indicated through an RRC signaling within the same semi-persistent resource configuration.

Optionally, in this implementation, the network side entity sends first configuration information for a first semi-persistent resource to the terminal through the RRC signaling, wherein the first configuration information includes first time information of the initial transmission resource used for initial transmission, and may also include second time information of the retransmission resource used for retransmission.

Optionally, in the above solution, for configuration of resources, a resource used for retransmission of the Nth initial transmission resource cannot be later than the (N+1)th initial transmission resource in time.

As another optional example, a time offset of the retransmission resource relative to the initial transmission resource is indicated through the RRC signaling within the same semi-persistent resource configuration.

Optionally, in this implementation, the network side entity sends second configuration information of the first semi-persistent resource through the RRC signaling, wherein the second configuration information includes the first time information of the initial transmission resource, and may also include third time information of the retransmission resource, wherein the third time information may include first time offset position information of the retransmission resource relative to the initial transmission resource. The terminal may infer the second time information of the retransmission resource through the first time offset position information and the first time information.

Optionally, in the above solution, for configuration of the resources, the resource used for retransmission of the Nth initial transmission resource cannot be later than the (N+1)th initial transmission resource in time.

As another optional example, the time information of the retransmission resource and time information of an associated initial transmission resource are indicated through the RRC signaling within different semi-persistent resources.

Optionally, in this implementation, the network side entity sends third configuration information for the first semi-persistent resource through the RRC signaling, wherein the third configuration information includes the first time information of the initial transmission resource; the network side entity sends fourth configuration information for a second semi-persistent resource through the RRC signaling, wherein the fourth configuration information includes fourth time information of the retransmission resource; and the network side entity may send association information about the first semi-persistent resource and the second semi-persistent resource to the terminal, wherein the association information may indicate to the terminal that the first semi-persistent resource is used for initial transmission and the second semi-persistent resource is used for retransmission.

Optionally, in the above solution, for configuration of the resources, the resource used for retransmission of the Nth initial transmission resource cannot be later than the (N+1)th initial transmission resource in time.

As another optional example, that the resource used for retransmission of the Nth initial transmission resource cannot be later than the (N+1)th initial transmission resource in time is not limited to the above implementation in which the semi-persistent resource is configured by the network side entity, but may also be applied to a case that a UE reserves a resource, that is, applied to D2D communication in Mode A and Mode B.

Optionally, in this implementation, for configuration of the resources, that the resource used for retransmission of the Nth initial transmission resource cannot be later than the (N+1)th initial transmission resource in time may be implemented by at least one of following modes: limiting the maximum time range of reservation of the resource used for retransmission of the Nth initial transmission resource; or limiting the maximum number of times of reservation of the resource used for retransmission of the Nth initial transmission resource.

This implementation provides a method for configuring information for a semi-persistent resource of a sidelink, which may be applied to a mechanism of sidelink channel semi-persistent resource configuration in a vehicle-to-everything system. The problem of how to configure the initial transmission resource and the retransmission resource of the semi-persistent resource in a cross-RAT system in the case that no DCI can be used may be solved through the above method, thereby achieving the technical effect that resource configuration may be performed without the DCI signaling.

A terminal in accordance with this implementation will be introduced below.

An implementation of the present disclosure further provides a terminal. It should be noted that the terminal in accordance with this implementation may be used for performing the method for resource configuration shown in FIG. 7 in accordance with an implementation of the present disclosure.

Figure 14:
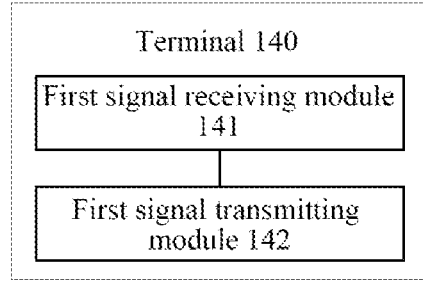
FIG. 14 is a schematic diagram of a terminal in accordance with an implementation of the present disclosure.

FIG. 14 is a schematic diagram of a terminal in accordance with an implementation of the present disclosure. As shown in FIG. 14, the terminal 140 may include a first signal receiving module 141 and a first signal transmitting module 142.

The first signal receiving module 141 is configured to cause the terminal to acquire configuration information of a semi-persistent resource sent by a network side entity through a radio resource control (RRC) signaling, wherein the configuration information is used for indicating at least one piece of following information: time information of a retransmission resource, time offset position information of the retransmission resource relative to an initial transmission resource, time information of the initial transmission resource, or time information of an initial transmission resource associated with the retransmission resource.

The first signal transmitting module 142 is configured to cause the terminal to transmit data using the semi-persistent resource based on the configuration information.

In the terminal in accordance with an implementation of the present disclosure, the terminal acquires the configuration information of the semi-persistent resource sent by the network side entity through the radio resource control (RRC) signaling, and transmits the data using the semi-persistent resource based on the configuration information, thus in a case that a DCI signaling exists, the DCI signaling may be used for implementing an operation other than resource configuration, while it is not limited to be that the resource configuration is implemented only through the DCI signaling. Even in a scenario in which no DCI signaling can be used or using of the DCI signaling is not supported, the resource configuration may also be implemented through the RRC signaling, thereby solving the technical problem that the resource configuration is difficult to perform without the DCI signaling, and achieving the technical effect that the resource configuration may also be implemented without the DCI signaling.

The above terminal will be further introduced below.

An implementation of the present disclosure further provides another terminal. It should be noted that the terminal in accordance with this implementation may be used for performing the method for resource configuration shown in FIG. 8 in accordance with an implementation of the present disclosure.

As an optional implementation, the first signal receiving module includes a first sub-signal receiving module; and the first signal transmitting module includes a first sub-signal transmitting module.

Figure 15:
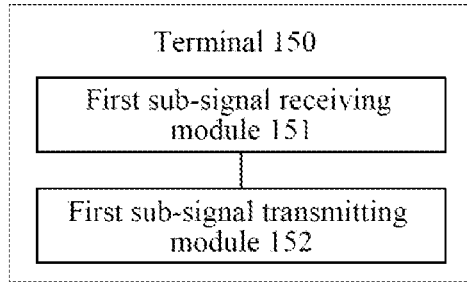
FIG. 15 is a schematic diagram of another terminal in accordance with an implementation of the present disclosure.

FIG. 15 is a schematic diagram of another terminal in accordance with an implementation of the present disclosure. As shown in FIG. 15, the terminal 150 may include a first sub-signal receiving module 151 and a first sub-signal transmitting module 152.

The first sub-signal receiving module 151 is configured to receive first configuration information of a first semi-persistent resource sent by a network side entity through a radio resource control (RRC) signaling, wherein the first configuration information includes first time information of an initial transmission resource and/or second time information of a retransmission resource.

The first sub-signal transmitting module 152 is configured to transmit data using the first semi-persistent resource based on the first time information and/or the second time information.

An implementation of the present disclosure further provides another terminal. It should be noted that the terminal in accordance with this implementation may be used for performing the method for resource configuration shown in FIG. 9 in accordance with an implementation of the present disclosure.

As an optional implementation, the first signal receiving module includes a second sub-signal receiving module; and the first signal transmitting module includes a second sub-signal transmitting module.

Figure 16:
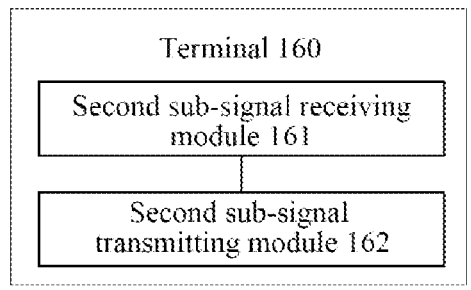
FIG. 16 is a schematic diagram of another terminal in accordance with an implementation of the present disclosure.

FIG. 16 is a schematic diagram of another terminal in accordance with an implementation of the present disclosure. As shown in FIG. 16, the terminal 160 may include a second sub-signal receiving module 161 and a second sub-signal transmitting module 162.

The second sub-signal receiving module 161 is configured to receive second configuration information of a first semi-persistent resource sent by a network side entity through a radio resource control (RRC) signaling, wherein the second configuration information includes first time information of an initial transmission resource and third time information of a retransmission resource, and the third time information includes first time offset position information of the retransmission resource relative to the initial transmission resource.

The second sub-signal transmitting module 162 is configured to transmit data using the first semi-persistent resource based on the second configuration information.

An implementation of the present disclosure further provides another terminal. It should be noted that the terminal in accordance with this implementation may be used for performing the method for resource configuration shown in FIG. 10 in accordance with an implementation of the present disclosure.

As an optional implementation, the first signal receiving module includes a third sub-signal receiving module; and the first signal transmitting module includes a third sub-signal transmitting module.

Figure 17:
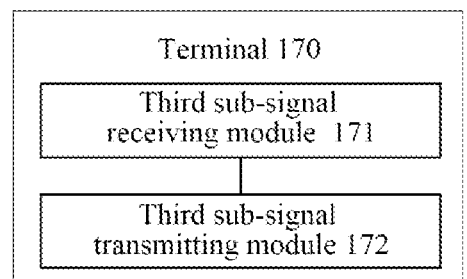
FIG. 17 is a schematic diagram of another terminal in accordance with an implementation of the present disclosure.

FIG. 17 is a schematic diagram of another terminal in accordance with an implementation of the present disclosure. As shown in FIG. 17, the terminal 170 may include a third sub-signal receiving module 171 and a third sub-signal transmitting module 172.

The third sub-signal receiving module 171 is configured to receive third configuration information of a first semi-persistent resource and fourth configuration information of a second semi-persistent resource sent to a terminal by a network side entity through a radio resource control (RRC) signaling, wherein the third configuration information includes first time information of the first semi-persistent resource used for initial transmission, the fourth configuration information includes fourth time information of the second semi-persistent resource used for retransmission, and the first semi-persistent resource is associated with the second semi-persistent resource.

The third sub-signal transmitting module 172 is configured to transmit data using the first semi-persistent resource based on the first time information, and transmit data using the second semi-persistent resource based on the fourth time information.

An implementation of the present disclosure further provides another terminal. It should be noted that the terminal in accordance with this implementation may be used for performing the method for resource configuration shown in FIG. 6 in accordance with an implementation of the present disclosure.

Figure 18:
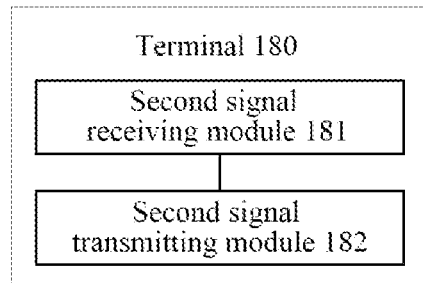
FIG. 18 is a schematic diagram of another terminal in accordance with an implementation of the present disclosure.

FIG. 18 is a schematic diagram of another terminal in accordance with an implementation of the present disclosure. As shown in FIG. 18, the terminal 180 may include a second signal receiving module 181 and a second signal transmitting module 182.

The second signal receiving module 181 is configured to cause a terminal to acquire configuration information of a resource, wherein the configuration information includes time information of an initial transmission resource of the resource, and a time indicated by time information of a resource used for retransmission of the Nth initial transmission resource is earlier than a time indicated by time information of the (N+1)th initial transmission resource, wherein N is a natural number greater than 0.

The second signal transmitting module 182 is configured to cause the terminal to transmit data using the resource based on the time information.

In the terminal in accordance with an implementation of the present disclosure, by setting the time indicated by the time information of the resource used for retransmission of the Nth initial transmission resource to be earlier than the time indicated by the time information of the (N+1)th resource used for initial transmission, the terminal may transmit the data normally based on the resource used for retransmission of the Nth resource used for initial transmission and the (N+1)th resource used for initial transmission in turn, to avoid a restriction on reservation of a retransmission resource caused by processing one semi-persistent resource using one HARQ process.

An apparatus for resource configuration in accordance with this implementation will be introduced below.

An implementation of the present disclosure further provides an apparatus for resource configuration from the network side entity side. It should be noted that the apparatus for configuring the resource in accordance with this implementation may be used for performing the method for resource configuration shown in FIG. 7 in accordance with an implementation of the present disclosure.

Figure 19:
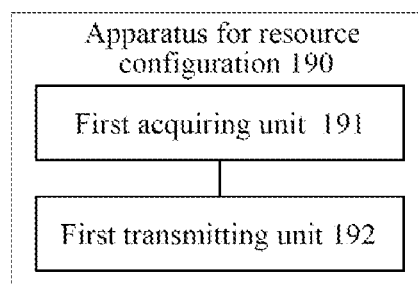
FIG. 19 is a schematic diagram of an apparatus for resource configuration in accordance with an implementation of the present disclosure.

FIG. 19 is a schematic diagram of an apparatus for resource configuration in accordance with an implementation of the present disclosure. As shown in FIG. 19, the apparatus 190 for configuring the resource may include a first acquiring unit 191 and a first transmitting unit 192.

The first acquiring unit 191 is configured to cause a terminal to acquire configuration information of a semi-persistent resource sent by a network side entity through a radio resource control (RRC) signaling, wherein the configuration information is used for indicating at least one piece of following information: time information of a retransmission resource, time offset position information of the retransmission resource relative to an initial transmission resource, time information of the initial transmission resource, or time information of an initial transmission resource associated with the retransmission resource.

The first transmitting unit 192 is configured to cause the terminal to transmit data using the semi-persistent resource based on the configuration information.

In the apparatus for configuring the resource in accordance with an implementation of the present disclosure, the terminal acquires the configuration information of the semi-persistent resource sent by the network side entity through the radio resource control (RRC) signaling, and transmits the data using the semi-persistent resource based on the configuration information, thus in a case that a DCI signaling exists, the DCI signaling may be used for implementing an operation other than resource configuration, while it is not limited to be that the resource configuration is implemented only through the DCI signaling. Even in a scenario in which no DCI signaling can be used or using of the DCI signaling is not supported, the resource configuration may also be implemented through the RRC signaling, thereby solving the technical problem that the resource configuration is difficult to perform without the DCI signaling, and achieving the technical effect that resource configuration may also be implemented without the DCI signaling.

An implementation of the present disclosure further provides another apparatus for resource configuration. It should be noted that the apparatus for configuring the resource in accordance with this implementation may be used for performing the method for resource configuration shown in FIG. 7 in accordance with an implementation of the present disclosure.

Figure 20:
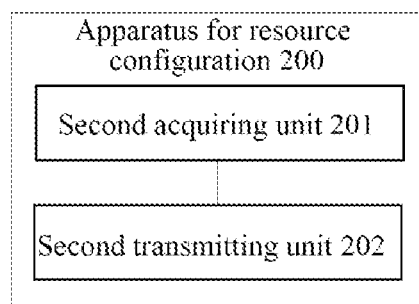
FIG. 20 is a schematic diagram of another apparatus for resource configuration in accordance with an implementation of the present disclosure.

FIG. 20 is a schematic diagram of another apparatus for resource configuration in accordance with an implementation of the present disclosure. As shown in FIG. 20, the apparatus 220 for configuring the resource may include a second acquiring unit 201 and a second transmitting unit 202.

The second acquiring unit 201 is configured to cause a terminal to acquire configuration information of a resource, wherein the configuration information includes time information of an initial transmission resource of the resource, and a time indicated by time information of a resource used for retransmission of the Nth initial transmission resource is earlier than a time indicated by time information of the (N+1)th initial transmission resource, wherein N is a natural number greater than 0.

The second transmitting unit 202 is configured to cause the terminal to transmit data using the resource based on the time information.

In the apparatus for configuring the resource in accordance with an implementation of the present disclosure, by setting the time indicated by the time information of the resource used for retransmission of the Nth resource used for initial transmission to be earlier than the time indicated by the time information of the (N+1)th resource used for initial transmission, the terminal may transmit the data normally based on the resource used for retransmission of the Nth resource used for initial transmission and the (N+1)th resource used for initial transmission in turn, to avoid a restriction on reservation of a retransmission resource caused by processing one semi-persistent resource using one HARQ process.

An implementation of the present disclosure further provides another apparatus for resource configuration. It should be noted that the apparatus for configuring the resource in accordance with this implementation may be used for performing the method for resource configuration shown in FIG. 1 in accordance with an implementation of the present disclosure.

Figure 21:
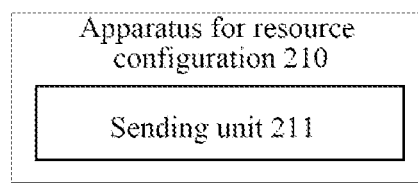
FIG. 21 is a schematic diagram of another apparatus for resource configuration in accordance with an implementation of the present disclosure.

FIG. 21 is a schematic diagram of another apparatus for resource configuration in accordance with an implementation of the present disclosure. As shown in FIG. 21, the apparatus 210 for configuring the resource includes a sending unit 211.

The sending unit 211 is configured to cause a network side entity to send configuration information of a semi-persistent resource to a terminal through a radio resource control (RRC) signaling, wherein the configuration information is used for causing the terminal to transmit data using the semi-persistent resource, and the configuration information is used for indicating at least one piece of following information: time information of a retransmission resource, time offset position information of the retransmission resource relative to an initial transmission resource, time information of the initial transmission resource, or time information of an initial transmission resource associated with the retransmission resource.

In the apparatus for configuring the resource in accordance with an implementation of the present disclosure, the network side entity sends the configuration information of the semi-persistent resource to the terminal through the radio resource control (RRC) signaling, so that the terminal may transmit the data using the semi-persistent resource based on the configuration information, thus in a case that a DCI signaling exists, the DCI signaling may be used for implementing an operation other than resource configuration, while it is not limited to be that the resource configuration is implemented only through the DCI signaling. Even in a scenario in which no DCI signaling can be used or using of the DCI signaling is not supported, the resource configuration may also be implemented through the RRC signaling, thereby solving the technical problem that the resource configuration is difficult to perform without the DCI signaling, and achieving the technical effect that the resource configuration may also be implemented without the DCI signaling.

An implementation of the present disclosure further provides a non-transitory storage medium. The non-transitory storage medium includes a stored program, wherein, when the program is run, a device, in which the non-transitory storage medium is located, is controlled to perform the method for resource configuration in accordance with an implementation of the present disclosure.

An implementation of the present disclosure further provides a terminal device. The terminal device may include a memory and a processor. A computer program is stored in the memory, and the processor is configured to run the computer program to execute the method for resource configuration in accordance with an implementation of the present disclosure.

The above serial numbers of the implementations of the present disclosure are only for description, and do not represent advantages and disadvantages of the implementations.

In the above implementations of the present disclosure, the description of each implementation has its own emphasis. A part which is not described in detail in a certain implementation may refer to the related description of another implementation.

In several implementations provided by the present disclosure, it should be understood that the disclosed technical contents may be implemented in another mode. Herein, the apparatus implementations described above are only illustrative. For example, the division of the units may be only a logical function division, and there may be another division mode in an actual implementation. For example, multiple units or components may be combined or integrated into another system, or some features may be ignored, or not executed. At another point, mutual coupling, or direct coupling, or a communication connection which is shown or discussed may be indirect coupling, or a communication connection through some interfaces, units, or modules, and may be in an electrical form, or another form.

The unit described as a separate component may or may not be physically separated, and the component shown as a unit may or may not be a physical unit, i.e., it may be located in one place, or may be distributed across multiple units. Part or all of the units thereof may be selected according to an actual need to achieve the purpose of the solution of the present implementation.

In addition, various functional units in various implementations of the present disclosure may be integrated into one processing unit, or various units may exist physically separately, or two or more than two units may be integrated into one unit. The integrated units may be implemented in a form of hardware, or may be implemented in a form of a software functional unit.

The integrated units, if implemented in the form of the software functional unit, and sold or used as an independent product, may be stored in a computer readable storage medium. Based on such understanding, the technical solutions of the present disclosure, in essence, or the part contributing to the prior art, or all or part of the technical solutions, may be embodied in a form of a software product, which is stored in a storage medium, and includes several instructions for causing a computer device (which may be a personal computer, a server, or a network side entity device, etc.) to perform all or part of the acts of the methods in accordance with various implementations of the present disclosure. And the aforementioned storage medium includes various media, such as a U disk, a read-only memory (ROM), a random access memory (RAM), a mobile hard disk, a magnetic disk, or an optical disk, which can store program codes What are described above are merely preferred implementations of the present disclosure. It should be pointed out that, several modifications and embellishments may be made by those of ordinary skill in the art without departing from the principles of the present disclosure, and these modifications and embellishments should also be deemed to be within the protection scope of the present disclosure.

The invention claimed is:

1. A method for resource configuration, comprising:
   acquiring, by a terminal, configuration information of a semi-persistent resource sent by a network side entity through a radio resource control (RRC) signaling, wherein the configuration information is used for indicating the following information: time offset position information of a retransmission resource relative to an initial transmission resource, and time information of the initial transmission resource;
   wherein acquiring, by the terminal, the configuration information of the semi-persistent resource sent by the network side entity through the RRC signaling comprises:
   acquiring, by the terminal, second configuration information of a first semi-persistent resource sent by the network side entity through the RRC signaling, wherein the second configuration information acquired under a second radio access type (RAT) sent by the network side entity through the RRC under a first RAT, wherein the second configuration information comprises first time information of the initial transmission resource and third time information of the retransmission resource, and the third time information comprises first time offset position information of the retransmission resource relative to the initial transmission resource; and
   transmitting, by the terminal, data using the semi-persistent resource based on the configuration information; wherein the first RAT is long term evolution (LTE) and the second RAT is new radio (NR).

2. The method of claim 1, wherein acquiring, by the terminal, the configuration information of the semi-persistent resource sent by the network side entity through the RRC signaling comprises:
   acquiring, by the terminal, first configuration information of the first semi-persistent resource sent by the network side entity through the RRC signaling, wherein the first configuration information comprises first time information of the initial transmission resource, and/or second time information of the retransmission resource.

3. The method of claim 2, wherein the terminal transmits the data on a sidelink using the first semi-persistent resource based on the first time information and/or the second time information.

4. The method of claim 2, wherein acquiring, by the terminal, the first configuration information of the first semi-persistent resource sent by the network side entity through the RRC signaling comprises:
   acquiring, by the terminal, the first configuration information under the second RAT sent by the network side entity through the RRC signaling under the first radio access type.

5. A terminal device, comprising a memory and a processor, wherein a computer program is stored in the memory, and the processor is configured to run the computer program to perform:
   acquiring configuration information of a semi-persistent resource sent by a network side entity through a radio resource control (RRC) signaling, wherein the configuration information is used for indicating the following information: time offset position information of a retransmission resource relative to an initial transmission resource, and time information of the initial transmission resource; wherein the processor is further configured to run the computer program to perform:
   enabling a terminal to acquire second configuration information of a first semi-persistent resource sent by the network side entity through the RRC signaling, wherein the second configuration information acquired under a second radio access type (RAT) sent by the network side entity through the RRC under a first RAT, wherein the second configuration information comprises first time information of the initial transmission resource and third time information of the retransmission resource, and the third time information comprises first time offset position information of the retransmission resource relative to the initial transmission resource; and
   transmitting data using the semi-persistent resource based on the configuration information.

6. The terminal device of claim 5, wherein acquiring the configuration information of the semi-persistent resource sent by the network side entity through the RRC signaling comprises:

acquiring first configuration information of the first semi-persistent resource sent by the network side entity through the RRC signaling, wherein the first configuration information comprises first time information of the initial transmission resource, and second time information of the retransmission resource.

7. The terminal device of claim 6, wherein the processor is further configured to run the computer program to perform:
transmitting the data on a sidelink using the first semi-persistent resource based on the first time information and the second time information.

8. The terminal device of claim 6, wherein acquiring the first configuration information of the first semi-persistent resource sent by the network side entity through the RRC signaling comprises:
acquiring the first configuration information under the second RAT sent by the network side entity through the RRC signaling under the first radio access type.

9. A method for resource configuration, comprising:
sending, by a network side entity, configuration information of a semi-persistent resource to a terminal through a radio resource control (RRC) signaling, wherein the configuration information is used for enabling the terminal to transmit data using the semi-persistent resource, and the configuration information is used for indicating the following information:
time offset position information of a retransmission resource relative to an initial transmission resource, and time information of the initial transmission resource;
wherein sending, by the network side entity, the configuration information of the semi-persistent resource to the terminal through the RRC signaling, further comprises:
sending, by the network side entity, second configuration information of a first semi-persistent resource to the terminal through the RRC signaling, the second configuration information sent under a second radio access type (RAT) to the terminal through the RRC signaling under a first RAT, wherein the second configuration information comprises first time information of the initial transmission resource and third time information of the retransmission resource, and the third time information comprises first time offset position information of the retransmission resource relative to the initial transmission resource;
wherein the first RAT is long term evolution (LTE), and the second RAT is new radio (NR).

10. The method of claim 9, wherein sending, by the network side entity, the configuration information of the semi-persistent resource to the terminal through the RRC signaling comprises:
sending, by the network side entity, first configuration information of the first semi-persistent resource to the terminal through the RRC signaling, wherein the first configuration information comprises first time information of the initial transmission resource and/or second time information of the retransmission resource.

11. The method of claim 10, wherein the first time information and/or the second time information is used for enabling the terminal to transmit the data on a sidelink using the first semi-persistent resource.

12. The method of claim 10, wherein sending, by the network side entity, the first configuration information of the first semi-persistent resource to the terminal through the RRC signaling comprises:
sending, by the network side entity, the first configuration information under the second RAT to the terminal through the RRC signaling under the first radio access type.

* * * * *